(12) United States Patent
Kimura et al.

(10) Patent No.: US 11,715,904 B2
(45) Date of Patent: Aug. 1, 2023

(54) WIRE HARNESS AND GROMMET DETACHMENT PREVENTING STRUCTURE

(71) Applicant: Yazaki Corporation, Tokyo (JP)

(72) Inventors: Akitoshi Kimura, Toyota (JP); Masayoshi Ogawa, Toyota (JP); Kazuya Takahashi, Toyota (JP)

(73) Assignee: YAZAKI CORPORATION, Minato-ku (JP)

( * ) Notice: Subject to any disclaimer, the term of this patent is extended or adjusted under 35 U.S.C. 154(b) by 105 days.

(21) Appl. No.: 17/371,903

(22) Filed: Jul. 9, 2021

(65) Prior Publication Data
US 2022/0013949 A1 Jan. 13, 2022

(30) Foreign Application Priority Data
Jul. 10, 2020 (JP) ................. 2020-119017

(51) Int. Cl.
*H01R 13/502* (2006.01)
*H01R 13/52* (2006.01)
*H01R 13/74* (2006.01)

(52) U.S. Cl.
CPC ....... *H01R 13/502* (2013.01); *H01R 13/5202* (2013.01); *H01R 13/74* (2013.01)

(58) Field of Classification Search
CPC .. H01R 13/502; H01R 13/5202; H01R 13/74; H01R 13/743; H01R 31/06; H01R 2201/26; H02G 3/0468; H02G 3/22
See application file for complete search history.

(56) References Cited

U.S. PATENT DOCUMENTS

| | | | | |
|---|---|---|---|---|
| 5,487,680 | A * | 1/1996 | Yamanashi | H01R 13/743 |
| | | | | 439/567 |
| 7,943,854 | B1 * | 5/2011 | Lipp | H02G 11/00 |
| | | | | 174/152 G |
| 9,888,904 | B2 * | 2/2018 | Choo | B06B 1/0622 |
| 10,840,632 | B2 * | 11/2020 | Ogawa | H01R 13/5205 |
| 10,899,294 | B2 * | 1/2021 | Kimura | H01R 13/743 |

(Continued)

FOREIGN PATENT DOCUMENTS

| | | |
|---|---|---|
| JP | 2016-86520 A | 5/2016 |
| JP | 2017-191636 A | 10/2017 |
| JP | 2020-35680 A | 3/2020 |

*Primary Examiner* — Abdullah A Riyami
*Assistant Examiner* — Nader J Alhawamdeh
(74) *Attorney, Agent, or Firm* — Sughrue Mion, PLLC

(57) ABSTRACT

A wire harness includes a connector, a grommet assembled to the connector and being in close contact with one opening edge portion of an attachment hole of a panel, and a plurality of electric wires that are inserted into the grommet. The connector includes terminal fittings provided at end portions of the plurality of electric wires, a connector housing that accommodates the terminal fittings, and an inner member having an annular plate-shaped flange disposed outside the connector housing. The grommet includes a flange assembly portion that is assembled to the flange, and an electric wire accommodating dome portion that accommodates drawn-out portions of the plurality of electric wires being drawn out from the connector housing. The inner member includes two deformation preventing walls that prevent the electric wire accommodating dome portion from being deformed inward.

8 Claims, 21 Drawing Sheets

(56) References Cited

U.S. PATENT DOCUMENTS

| | | | |
|---|---|---|---|
| 11,066,024 B2* | 7/2021 | Kimura | H02G 3/22 |
| 2016/0068120 A1* | 3/2016 | Jin | B60R 16/0222 |
| | | | 16/2.2 |
| 2020/0070752 A1* | 3/2020 | Kimura | B60R 16/0222 |
| 2020/0076117 A1* | 3/2020 | Ogawa | H01R 13/5202 |
| 2022/0013949 A1* | 1/2022 | Kimura | H01R 13/5202 |

* cited by examiner

WIRE HARNESS AND GROMMET DETACHMENT PREVENTING STRUCTURE

CROSS-REFERENCE TO RELATED APPLICATIONS

This application is based on and claims priority under 35 USC 119 from Japanese Patent Application No. 2020-119017 filed on Jul. 10, 2020, the contents of which are incorporated herein by reference.

TECHNICAL FIELD

The present disclosure relates to a wire harness and a grommet detachment preventing structure, and more particularly, to a wire harness including a grommet detachment preventing structure that prevents detachment of a grommet constituting a waterproof structure, and a grommet detachment preventing structure.

BACKGROUND ART

JP-A-2017-191636 discloses a related-art waterproof structure provided on a panel of a door portion of an automobile. In FIG. 21A, a related-art waterproof structure 1 includes a panel 3 having an attachment hole 2, a connector 4 that is disposed so as to be aligned with the attachment hole 2, and a grommet 5 that is assembled to the connector 4 and is in close contact with one opening edge portion of the attachment hole 2. The connector 4 includes a connector housing 6 and an inner member 7. The inner member 7 includes an annular plate-shaped flange 8 disposed outside the connector housing 6. The grommet 5 includes a panel close contact portion 9, a flange assembly portion 10 and an electric wire accommodating dome portion 11. The grommet 5 is made of rubber and has flexibility. The electric wire accommodating dome portion 11 is formed in a dome shape as shown in the drawing having a U-shaped cross section for accommodating a plurality of electric wires (a drawn-out portion that is not shown) immediately after being drawn out from the connector housing 6. It is assumed that the plurality of electric wires are bundled, and a tubular portion that accommodates the electric wires is continuous with the electric wire accommodating dome portion 11.

In the related art described above, when an external force indicated by an arrow P in FIG. 21A is applied to a side portion 12 of the electric wire accommodating dome portion 11 for some reason, the side portion 12 of the electric wire accommodating dome portion 11 may be deformed inward as shown in FIG. 21B, and at this time, the flange assembly portion 10 may be detached from the flange 8. When the flange assembly portion 10 remains detached, that is, when the grommet 5 remains detached, moisture enters, and thus waterproof performance cannot be ensured.

SUMMARY OF INVENTION

The present disclosure has been made in view of the above circumstances, and an object thereof is to provide a wire harness including a grommet detachment preventing structure capable of preventing detachment of a grommet, and a grommet detachment preventing structure.

Aspect of non-limiting embodiments of the present disclosure relates to a wire harness including: a connector that is disposed so as to be aligned with an attachment hole of a panel; a grommet that is assembled to the connector and is in close contact with one opening edge portion of the attachment hole; and a plurality of electric wires that are inserted into the grommet. The connector includes terminal fittings provided at end portions of the plurality of electric wires, a connector housing in which the terminal fittings are accommodated, and an inner member including an annular plate-shaped flange disposed outside the connector housing. The grommet includes a panel close contact portion that is in close contact with the one opening edge portion, a flange assembly portion that is assembled to the flange, and an electric wire accommodating dome portion that accommodates a drawn-out portion of the plurality of electric wires immediately after being drawn out from the connector housing. The inner member includes two deformation preventing walls as portions that prevent the electric wire accommodating dome portion from being deformed inward. The two deformation preventing walls are formed in a shape extending along a wall inner surface of the electric wire accommodating dome portion and a shape in which the drawn-out portion is disposed therebetween.

According to the wire harness of the present disclosure, detachment of the grommet can be prevented by the two deformation preventing walls. In addition, the grommet detachment preventing structure according to the present disclosure can also prevent detachment of the grommet by the two deformation preventing walls, and thus a better structure can be provided.

BRIEF DESCRIPTION OF DRAWINGS

FIGS. 1A and 1B are views showing an embodiment of a wire harness and a grommet detachment preventing structure according to the present disclosure, in which FIG. 1A is an overall view of the wire harness, and FIG. 1B is a view showing a state in which a connector housing is omitted from FIG. 1A.

FIGS. 2A, 2B and 2C are cross-sectional views taken along a line A-A in FIG. 1B, in which FIG. 2A is a schematic view of deformation preventing walls according to a first embodiment, FIG. 2B is a schematic view of deformation preventing walls according to a second embodiment, and FIG. 2C is a schematic view of deformation preventing walls according to third, fourth and fifth embodiments.

FIGS. 21A and 21B are cross-sectional views showing a related-art waterproof structure, in which FIG. 21A is a view showing a configuration, and FIG. 21B is a view showing a state in which a grommet is detached by an external force.

DESCRIPTION OF EMBODIMENTS

A wire harness includes a connector that is disposed so as to be aligned with an attachment hole of a panel, and a grommet that is assembled to the connector and is in close contact with one opening edge portion of the attachment hole. The connector includes a connector housing and an inner member. The grommet includes a panel close contact portion, a flange assembly portion and an electric wire accommodating dome portion. The inner member includes an annular plate-shaped flange disposed outside the connector housing and two deformation preventing walls. The two deformation preventing walls are formed in a shape extending along a wall inner surface of the electric wire accommodating dome portion and in a shape in which a plurality of electric wires are disposed therebetween.

The two deformation preventing walls are each formed to have a straight I-shaped cross section. Alternatively, the two deformation preventing walls are each formed to have a J-shaped cross section in which a tip end portion thereof is bent, and are formed to have a U-shaped cross section when the two are viewed as a whole. Alternatively, the two deformation preventing walls are formed to respectively have a straight I-shaped cross section and a J-shaped cross section in which an intermediate portion thereof is bent, and are formed to have a U-shaped cross section when the two are viewed as a whole. The two deformation preventing walls are disposed on sides of a pair of straight portions of an oval attachment hole of the panel. The above grommet detachment preventing structure is adopted in a wire harness.

First Embodiment

Hereinafter, a first embodiment will be described with reference to the drawings.

Figure 1A:
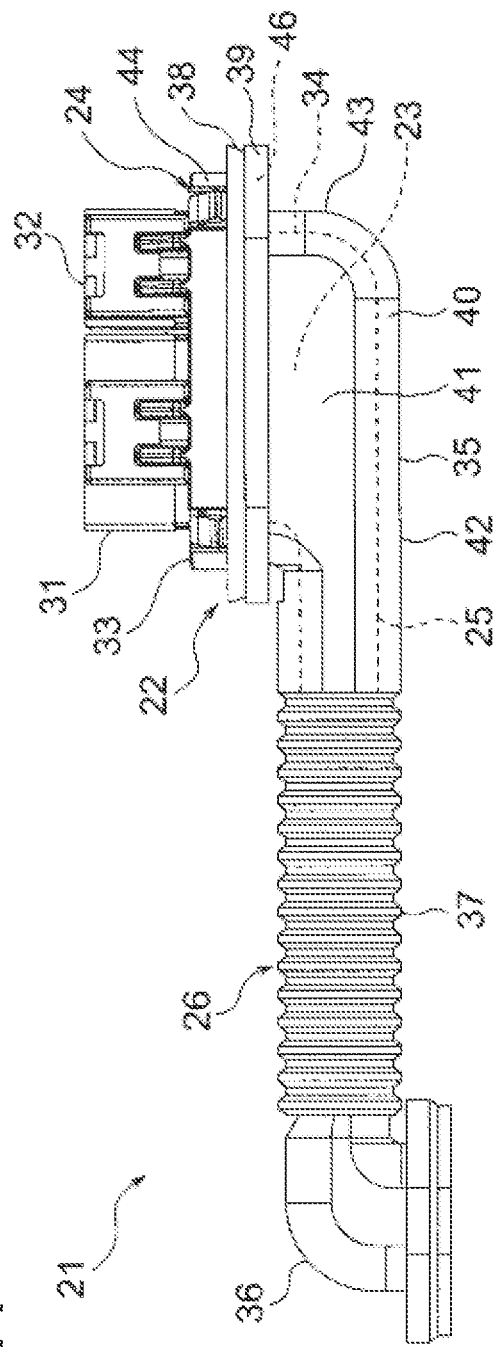
Figure 1B:
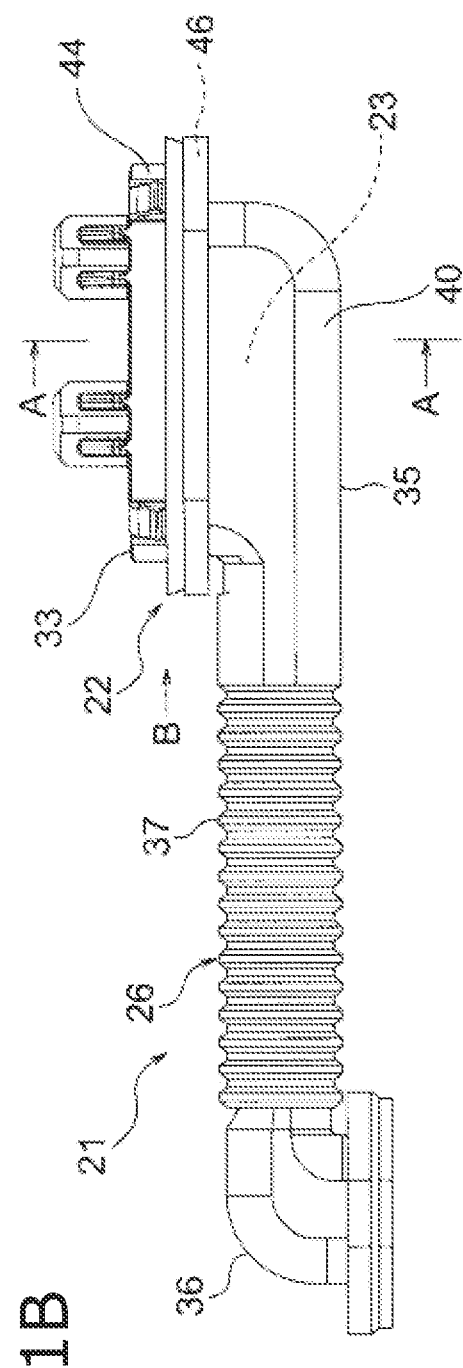
Figures 2A, 2B, 2C:
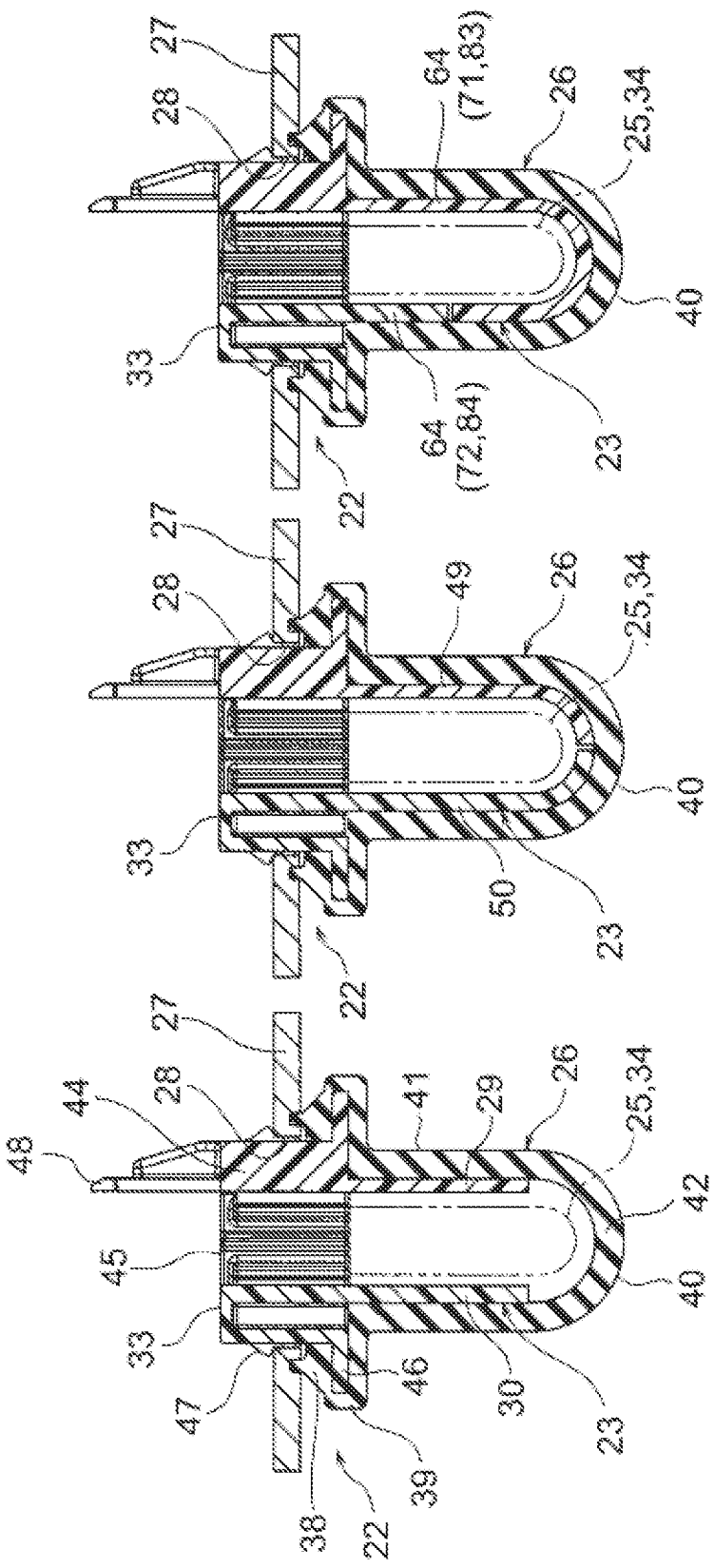
Figure 3:
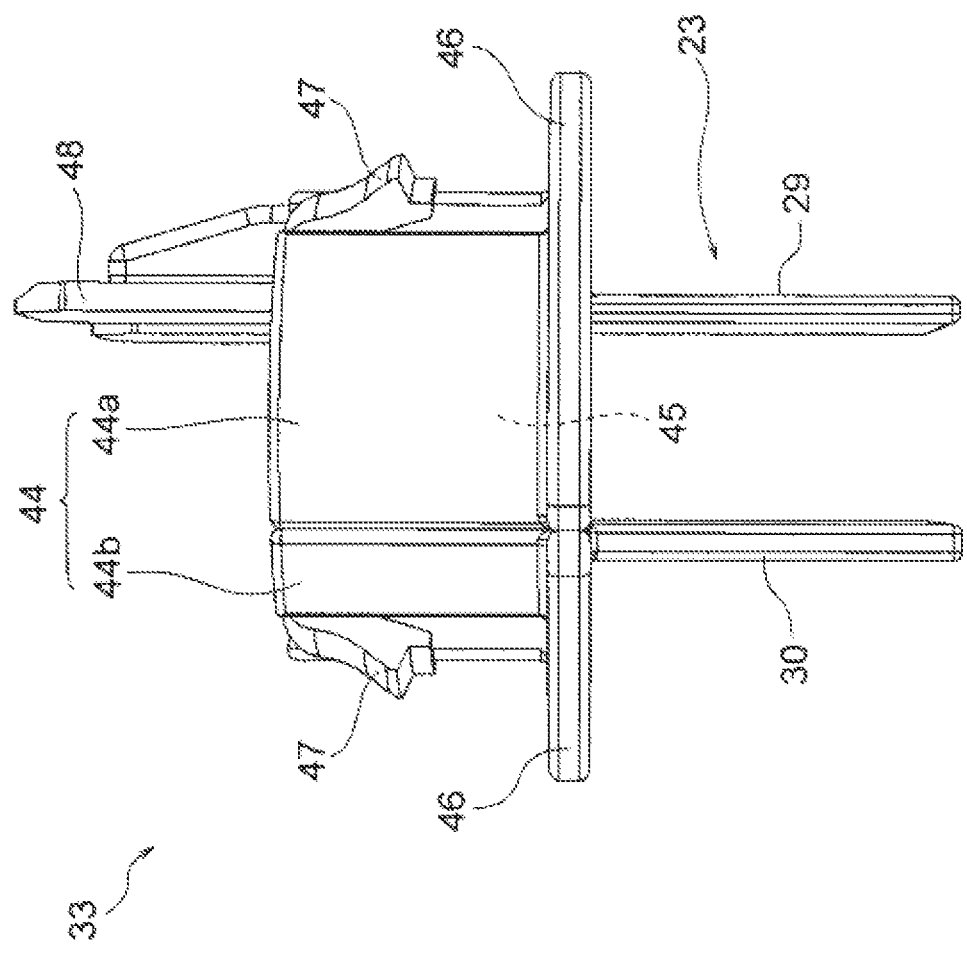
FIG. 3 is a view of an inner member including the deformation preventing walls corresponding to FIG. 2A, and is a view seen from a direction of an arrow B in FIG. 1B (the first embodiment).
Figure 4:
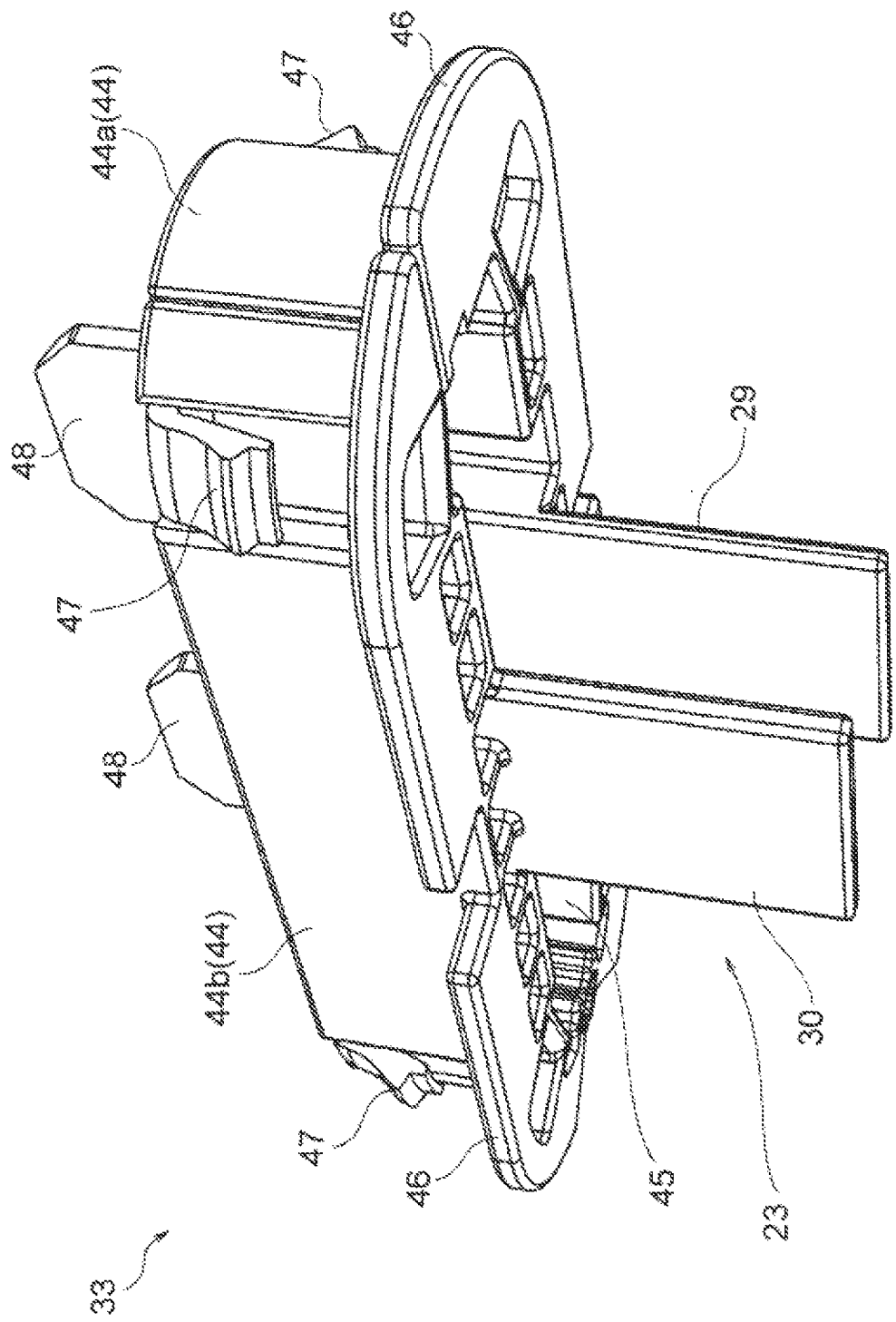
FIG. 4 is a perspective view of the inner member in FIG. 3.

FIGS. 1A and 1B are views showing an embodiment of a wire harness and a grommet detachment preventing structure according to the present disclosure, in which FIG. 1A is an overall view of the wire harness, and FIG. 1B is a view showing a state in which a connector housing is omitted from FIG. 1A, FIGS. 2A, 2B and 2C are cross-sectional views taken along a line A-A in FIG. 1B, FIG. 3 is a view of an inner member including the deformation preventing walls corresponding to FIG. 2A, and FIG. 4 is a perspective view of the inner member in FIG. 3.

<Wire Harness 21>

In FIGS. 1A and 1B, a wire harness 21 is wired, for example, through an opening and closing position of a door portion of an automobile. The wire harness 21 that is wired in this way requires a waterproof structure 22 as in a related-art case. In the present disclosure, a grommet detachment preventing structure 23 is adopted in order to maintain a waterproof function of the waterproof structure 22. The wire harness 21 includes a connector 24 on one end side, a connector (not shown) on the other end side, a plurality of electric wires 25, and a grommet 26. The wire harness 21 is connected to a mating connector (not shown) of a vehicle body via the connector 24 on the one end side, and is connected to a connector (a device) (not shown) on a door portion side via the connector (not shown) on the other end side. In the wire harness 21, the connector 24 on the one end side is disposed so as to be aligned with an attachment hole 28 of a panel 27 (see FIGS. 2A to 2C). The wire harness 21 includes the grommet 26 as the waterproof structure 22 in order to prevent moisture from entering inside of the panel 27 from the attachment hole 28. The wire harness 21 includes the grommet detachment preventing structure 23 together with the waterproof structure 22 in order to maintain the waterproof function.

<Waterproof Structure 22 and Grommet Detachment Preventing Structure 23>

In FIGS. 2A to 2C, the waterproof structure 22 is formed of the grommet 26, and a known structure is adopted. Therefore, detailed description here will be omitted. The grommet detachment preventing structure 23 is provided together with the waterproof structure 22, and a structure that prevents detachment of the grommet 26 is provided in an inner member 33 described later of the connector 24 on the one end side. Examples of an outline of the grommet detachment preventing structure 23 includes a structure of a type (described in the first embodiment) including two deformation preventing walls 29, 30 each formed to have a straight I-shaped cross section as shown in FIG. 2A, a structure of a type (described in a second embodiment) including two deformation preventing walls 49, 50 each formed to have a J-shaped cross section in which a tip end portion thereof is bent and formed to have a U-shaped cross section when the two are as a whole as shown in FIG. 2B, and a structure of a type (described in third to fifth embodiments) including two deformation preventing walls 63, 64 (71, 72) (83, 84) formed to respectively have a straight I-shaped cross section and a J-shaped cross section in which an intermediate portion thereof is bent and formed to have a U-shaped cross section when the two are viewed as a whole as shown in FIG. 2C.

<Connector 24 and Electric Wire 25>

In FIG. 1A, the connector 24 includes terminal fittings (not shown) provided at end portions of the plurality of electric wires 25, connector housings 31, 32 in which the terminal fittings are accommodated, and the inner member 33. The connector housings 31, 32 are resin molded products and are not particularly marked, and each includes a housing main body, a plurality of terminal accommodating chambers formed inside the housing main body, a mating connector fitting portion formed outside the housing main body, and an inner fixing portion similarly formed outside the housing main body and fixed to the inner member 33. The inner member 33 will be described later. The electric wire 25 includes a conductor and an insulator covering the conductor. Here, a general thin electric wire for low voltage is adopted as the electric wire 25. Since the terminal fittings are respectively accommodated in the terminal accommodating chambers, the electric wires 25 are drawn out from the connector housings 31, 32. When a portion immediately after being drawn out from the connector housings 31, 32 is referred to as a drawn-out portion 34, the drawn-out portion 34 is disposed between the two deformation preventing walls 29, 30 in FIG. 2A (the drawn-out portion 34 is schematically shown for convenience). The drawn-out portion 34 is accommodated in a one end side tubular portion 35 described later of the grommet 26. The plurality of electric wires 25 are formed into a bundle shape after the drawn-out portion 34 is formed, and are accommodated in an intermediate tubular portion 37 described later of the grommet 26.

<Grommet 26>

In FIGS. 1A to 2C, the grommet 26 is, for example, an elastic body made of rubber, and is formed in a shown shape by including the one end side tubular portion 35, the other end side tubular portion 36, and the intermediate tubular portion 37 disposed therebetween. The one end side tubular portion 35 is formed in a portion that is assembled to the connector 24 on the one end side and is in close contact with one opening edge portion of the attachment hole 28 of the panel 27, In addition, the one end side tubular portion 35 is formed in the portion in which the drawn-out portion 34 of the plurality of electric wires 25 is accommodated. The attachment hole 28 according to the present embodiment is formed as an oval through hole having a pair of straight portions and a pair of arc portions. The one end side tubular portion 35 is formed in a shown shape by including a panel close contact portion 38 that is in close contact with the one opening edge portion, a flange assembly portion 39 that is assembled to a flange 46 described later, and an electric wire accommodating dome portion 40 that accommodates the drawn-out portion 34. The panel close contact portion 38 is formed in a shape that is easily elastically deformed and easily comes into close contact. The flange assembly portion 39 is formed to have a concave-shaped cross section. The electric wire accommodating dome portion 40 is formed to have a U-shaped cross section. Since the attachment hole 28 has an oval shape, the electric wire accommodating dome portion 40 is formed in a shape in which side portions 41 corresponding to the pair of straight portions are relatively long in a grommet axial direction (since the side portions 41 have such a shape, the electric wire accommodating dome portion 40 can be said to be a portion that is easily deformed inward by itself). In the electric wire accommodating dome portion 40, a reference numeral 42 denotes an arc-shaped bottom portion, and a reference numeral 43 denotes an arc-shaped side portion.

The other end side tubular portion 36 is formed in a shape obtained by reducing a size of the one end side tubular portion 35 in the present embodiment. Similarly to the one end side tubular portion 35, the other end side tubular portion 36 includes a panel close contact portion, a flange assembly portion and an electric wire accommodating dome portion (reference numerals of the portions are omitted). The other end side tubular portion 36 is disposed so as to open in a direction opposite to the one end side tubular portion 35 in the present embodiment. The intermediate tubular portion 37 between the other end side tubular portion 36 and the one end side tubular portion 35 is formed in a bellows tube shape having a circular cross section. The intermediate tubular portion 37 is formed so as to be freely bendable and stretchable. The intermediate tubular portion 37 may be referred to as a small diameter portion, and the other end side tubular portion 36 and the one end side tubular portion 35 may be referred to as large diameter portions.

<Inner Member 33>

In FIGS. 2A to 4, the inner member 33 is a resin molded product, and is formed in a shown shape by including an inner member main body 44 and the two deformation preventing walls 29, 30. In the inner member 33, the two deformation preventing walls 29, 30 serving as characteristic portions of the grommet detachment preventing structure 23 are integrally formed with the inner member main body 44. A housing accommodating portion 45 is formed inside the inner member main body 44. The flange 46, the two deformation preventing walls 29, 30, a plurality of panel engaging portions 47 and two housing fixing portions 48 are formed on an outer side of the inner member main body 44. The inner member main body 44 is formed so as to have a two-divided structure, which will be described in second and subsequent embodiments. The housing accommodating portion 45 is formed in a shape capable of accommodating and holding the connector housings 31, 32 (see FIG. 1A). The flange 46 is an annular plate-shaped portion and is disposed outside the connector housings 31, 32. An outer peripheral edge of the flange 46 is formed in a convex shape in cross section as a portion that is assembled to the flange assembly portion 39 of the grommet 26. The panel engaging portion 47 is formed at a portion that passes through the attachment hole 28 of the panel 27 and is hooked on the other opening edge portion. The two housing fixing portions 48 are formed at portions where the connector housings 31 are fixed via the inner fixing portions (a shown shape of the housing fixing portion 48 is an example).

<Two Deformation Preventing Walls 29, 30>

In FIGS. 2A to 4, the two deformation preventing walls 29, 30 are characteristic portions of the grommet detachment preventing structure 23 as described above, and are formed as portions that prevent the side portions 41 of the electric wire accommodating dome portion 48 from being deformed inward. The two deformation preventing walls 29, 30 according to the first embodiment are each formed to have a straight I-shaped cross section. The two deformation preventing walls 29, 30 are formed in a shape extending along wall inner surfaces of the side portions 41 of the electric wire accommodating dome portion 40 (extending downward in the drawing) and in a shape in which the drawn-out portion 34 of the plurality of electric wires 25 are disposed therebetween. The two deformation preventing walls 29, 30 are each formed as a rectangular wall portion in the present embodiment. Base end sides of the two deformation preventing walls 29, 30 are disposed at positions corresponding to the pair of straight portions of the oval attachment hole 28. The two deformation preventing walls 29, 30 are disposed in parallel as a whole. The two deformation preventing walls 29, 30 are disposed such that tip ends thereof are positioned at boundary portions between the side portions 41 and the arc-shaped bottom portion 42 of the electric wire accommodating dome portion 40. The two deformation preventing walls 29, 30 have rigidity to such an extent that the deformation preventing walls 29, 30 do not easily bend inward. In order to increase the rigidity, for example, a trapezoidal wall whose base end side is widened may be formed. In order to increase the rigidity, for example, a plurality of vertical ribs (reinforcing ribs) may be formed.

<Effects of Grommet Detachment Preventing Structure 23>

As described above with reference to FIGS. 1A to 4, according to the grommet detachment preventing structure 23 of the first embodiment, since the inner member 33 includes the two deformation preventing walls 29, 30, and the two deformation preventing walls 29, 30 are portions having a shape extending along the wall inner surfaces of the electric wire accommodating dome portion 40, even if an external force is applied to the electric wire accommodating dome portion 40 for some reason, the electric wire accommodating dome portion 40 can be prevented being deformed inward by the two deformation preventing walls 29, 30. This deformation prevention can also prevent detachment of the flange assembly portion 39 of the grommet 26 from the flange 46 of the inner member 33.

According to the first embodiment, the grommet detachment preventing structure 23 that prevents the detachment of the grommet 26 can be provided. Since the grommet detachment preventing structure 23 is adopted, a better wire harness 21 can be provided. In other words, the wire harness 21 that prevents the detachment of the grommet 26 can be provided. Since the detachment of the grommet 26 is prevented, a better structure (23) can be provided. In other words, the same applies to the second to fifth embodiments described below.

Second Embodiment

Figure 5:
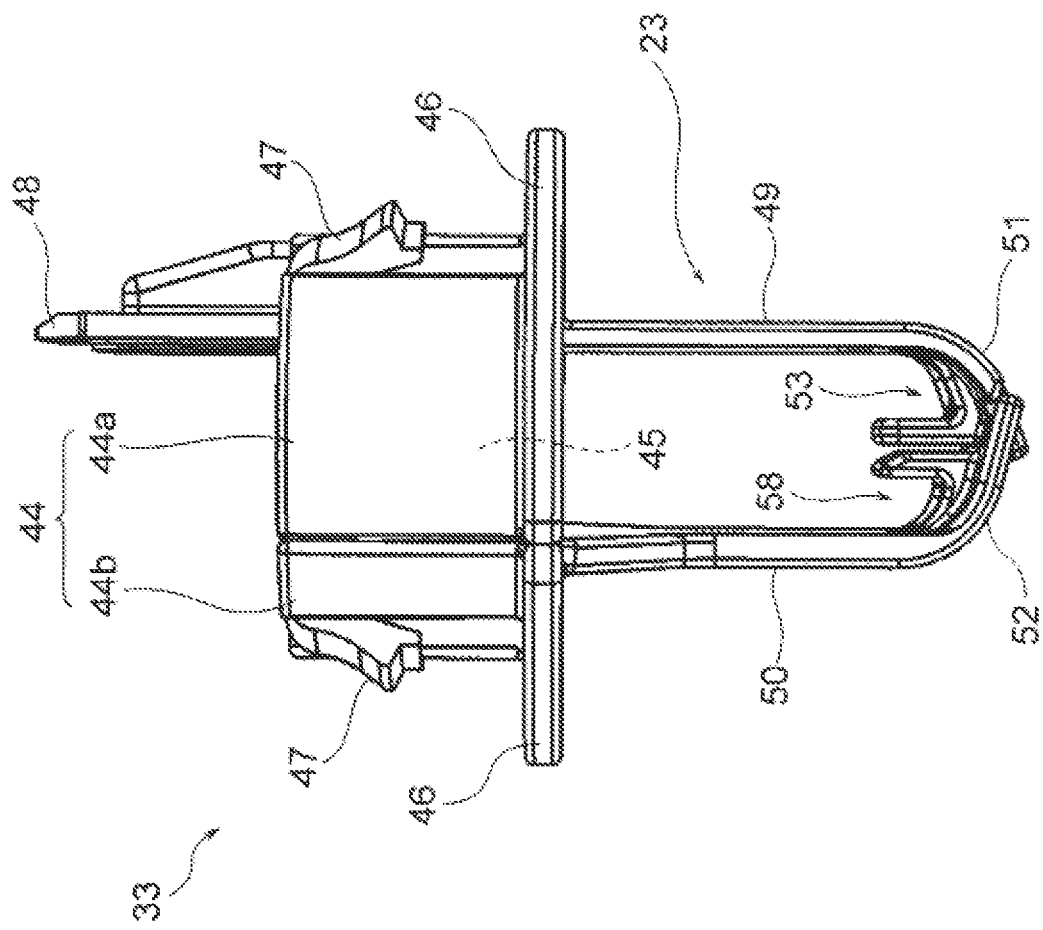
FIG. 5 is a view of an inner member including the deformation preventing walls corresponding to FIG. 2B, and is a view seen from the direction of the arrow B in FIG. 1B (the second embodiment).
Figure 6:
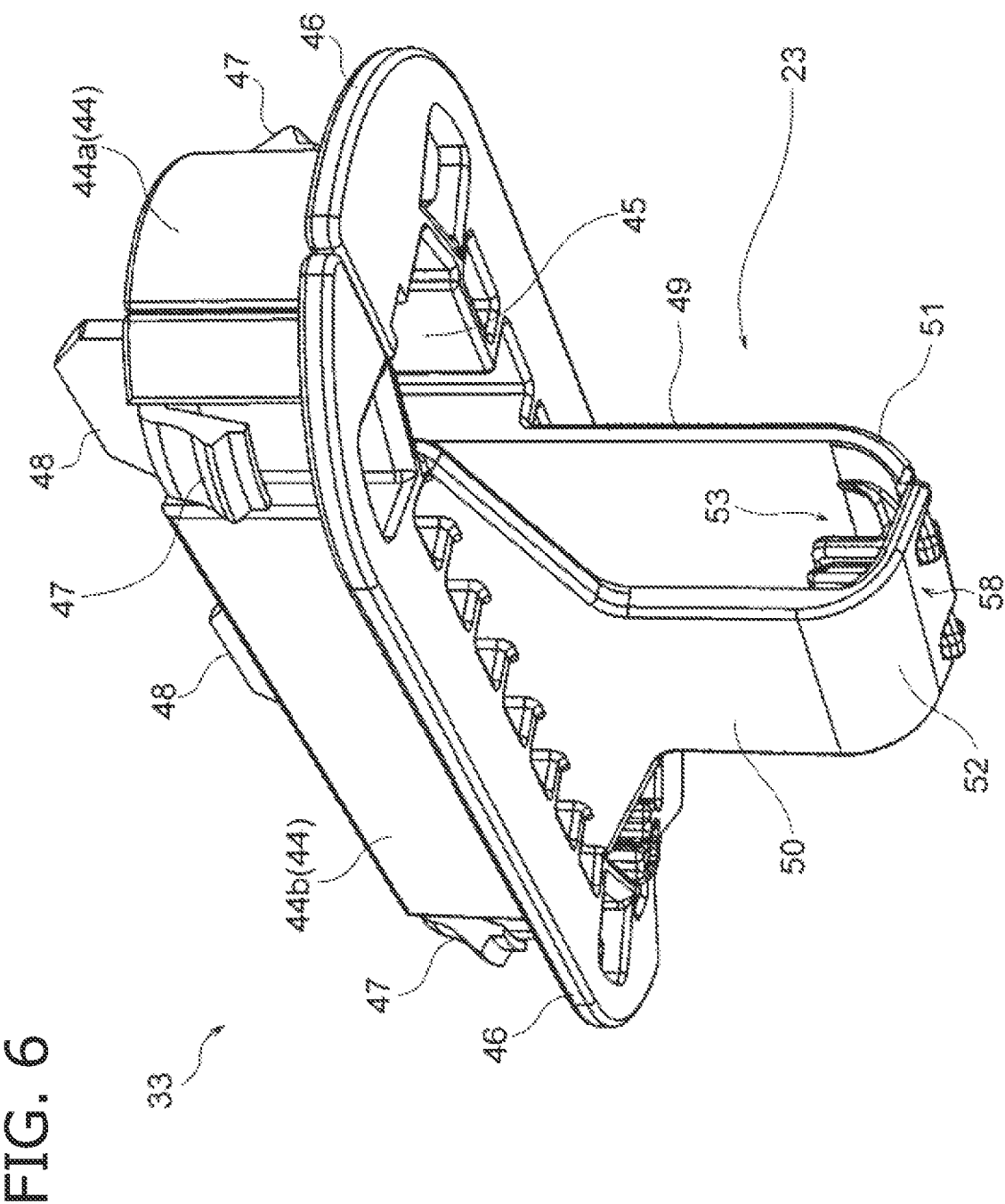
FIG. 6 is a perspective view of the inner member in FIG. 5.
Figure 7:
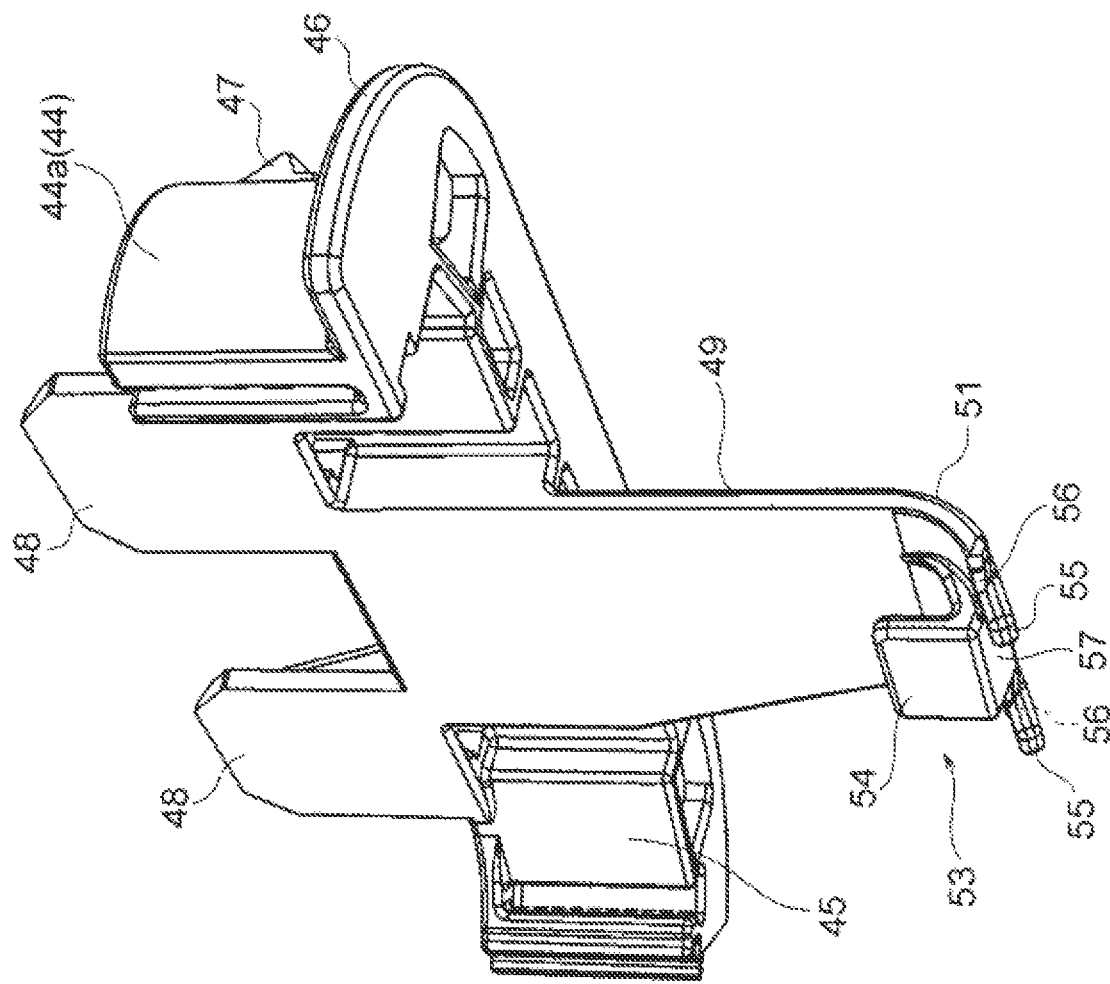
FIG. 7 is a perspective view of a first divided inner in FIG. 6.
Figure 8:
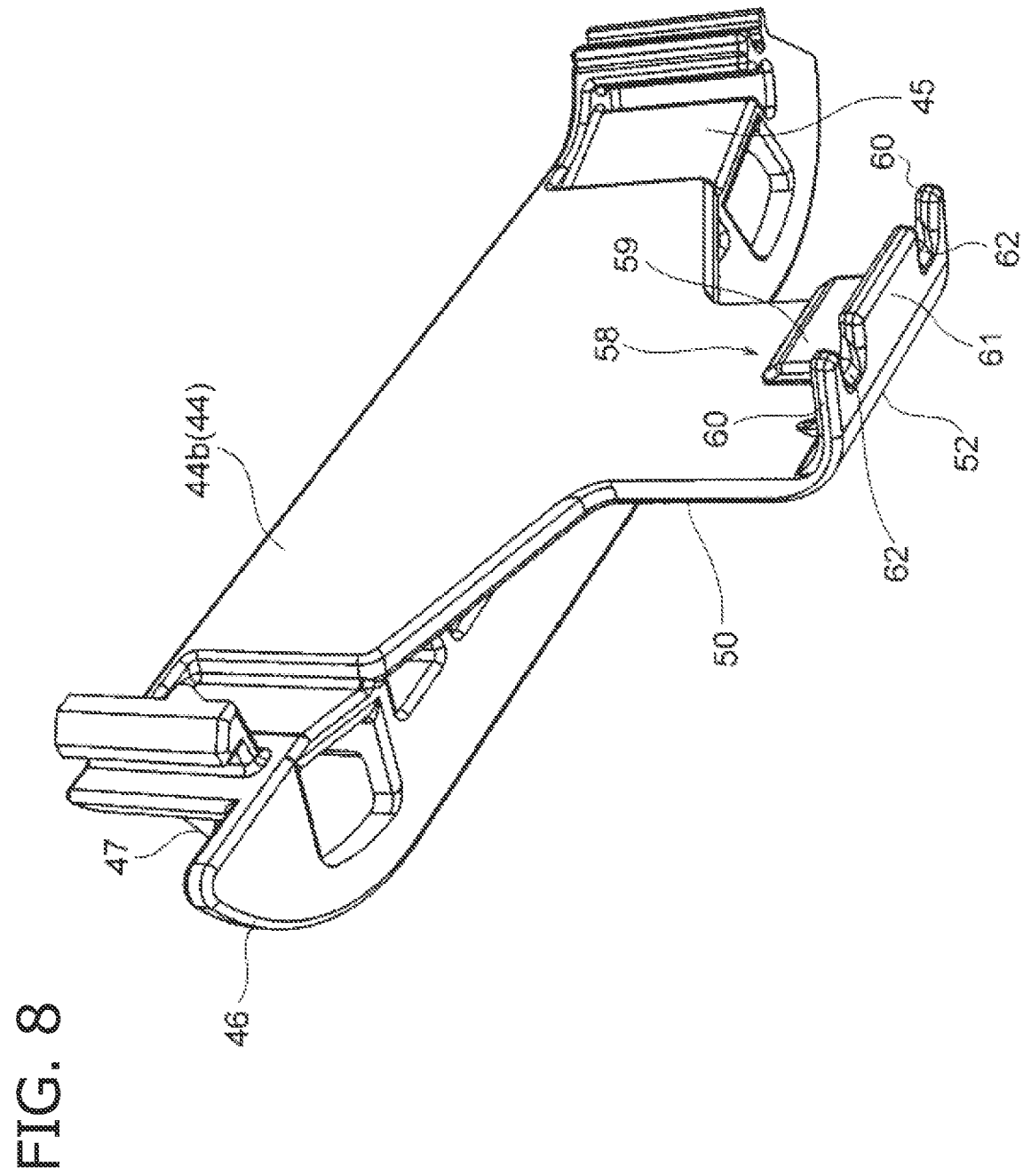
FIG. 8 is a perspective view of a second divided inner in FIG. 6.

Hereinafter, the second embodiment will be described with reference to the drawings. FIG. 5 is a view of an inner member including the deformation preventing walls corresponding to FIG. 2B. FIG. 6 is a perspective view of the inner member in FIG. 5, FIG. 7 is a perspective view of a first divided inner in FIG. 6, and FIG. 8 is a perspective view of a second divided inner in FIG. 6. The same components as those of the first embodiment are denoted by the same reference numerals, and detailed description thereof will be omitted.

<Grommet Detachment Preventing Structure 23 According to Second Embodiment>

In FIGS. 2B and 5, the grommet detachment preventing structure 23 according to the second embodiment is formed in the inner member 33 similarly to the first embodiment. The grommet detachment preventing structure 23 according to the second embodiment corresponds to the two deformation preventing walk 49, 50 integrated with the inner member main body 44. The two deformation preventing walls 49, 50 serving as the grommet detachment preventing structure 23 are each formed to have a J-shaped cross section in which each of tip end portions 51, 52 is bent, and are formed to have a U-shaped cross section when the two are viewed as a whole. The two deformation preventing walls 49, 50 are formed as portions that prevent the side portions 41 of the electric wire accommodating dome portion 40 from being deformed inward. The two deformation preventing walls 49, 50 are formed in a shape in which the tip end portions 51, 52 are engaged with each other. Base end sides of the two deformation preventing walls 49, 50 are disposed at positions the same as those of the first embodiment.

In FIGS. 5 to 8, the deformation preventing wall 49 is formed as a wall portion having a small change in width from the base end side continuous with a first divided inner 44a (that is obtained by dividing the inner member main body 44 into two and is integrated with a second divided inner 44b described later via a hinge) to the tip end portions 51. The deformation preventing wall 49 is formed so as to extend from the base end side to an intermediate portion along a wall inner surface of the side portion 41 of the electric wire accommodating dome portion 40 (extend downward in the drawing). The deformation preventing wall 49 is formed such that the drawn-out portion 34 of the plurality of electric wires 25 is disposed inside the deformation preventing wall 49 from the base end side to the intermediate portion (see FIG. 2B). The tip end portions 51 of the deformation preventing wall 49 is formed in a bent shape so as to extend along a wall inner surface of the arc-shaped bottom portion 42 of the electric wire accommodating dome portion 40. An engaging portion 53 is formed on the tip end portions 51 of the deformation preventing wall 49 as described above. The engaging portion 53 is formed in order to prevent the two deformation preventing walls 49, 50 from being displaced inward and from being laterally displaced. The engaging portion 53 is formed in a shown shape by including an abutting wall 54, a pair of meshing protrusions 55, meshing recesses 56 on both sides, and a meshing recess 57 in the middle. The engaging portion 53 prevents the above-described displacement by abutment and meshing. It goes without saying that the deformation preventing wall 49 itself is less likely to bend inward due to abutment and meshing of the engaging portion 53.

On the other hand, the deformation preventing wall 50 is formed as a wall portion whose base end side continuous with a second divided inner 44b (that is obtained by dividing the inner member main body 44 into two and is integrated with the first divided inner 44a via the hinge) is wider than that of the deformation preventing wall 49 to be paired. The deformation preventing wall 50 is formed so as to extend from the base end side to an intermediate portion along a wall inner surface of the side portion 41 of the electric wire accommodating dome portion 40 (extend downward in the drawing). The deformation preventing wall 50 is formed such that the drawn-out portion 34 of the plurality of electric wires 25 is disposed inside the deformation preventing wall 50 from the base end side to the intermediate portion. The tip end portions 52 of the deformation preventing wall 50 is formed in a bent shape so as to extend along the wall inner surface of the arc-shaped bottom portion 42 of the electric wire accommodating dome portion 40. An engaging portion 58 is formed on the tip end portions 52. The engaging portion 58 is formed at a portion of the deformation preventing wall 49 that is engaged with the engaging portion 53. The engaging portion 58 is formed in a shown shape by including an abutting wall 59, meshing protrusions 60 on both sides, a meshing protrusion 61 in the middle, and a pair of meshing recesses 62.

<Effects of Grommet Detachment Preventing Structure 23 According to Second Embodiment>

As described above with reference to FIGS. 2B and 5 to 8, according to the grommet detachment preventing structure 23 of the second embodiment, since the inner member 33 includes the two deformation preventing walls 49, 50, and the two deformation preventing walls 49, 50 are portions having a shape extending along the wall inner surfaces of the electric wire accommodating dome portion 40, even if an external force is applied to the electric wire accommodating dome portion 40 for some reason, the electric wire accommodating dome portion 40 can be prevented from being deformed inward by the two deformation preventing walls 49, 50. This deformation prevention can also prevent detachment of the flange assembly portion 39 of the grommet 26 from the flange 46 of the inner member 33.

In the second embodiment, detachment of the grommet 26 can be prevented as in the first embodiment. Since the grommet detachment preventing structure 23 according to the second embodiment is adopted, a better wire harness 21 (see FIGS. 1A and 1B) can be provided.

Third Embodiment

Figure 9:
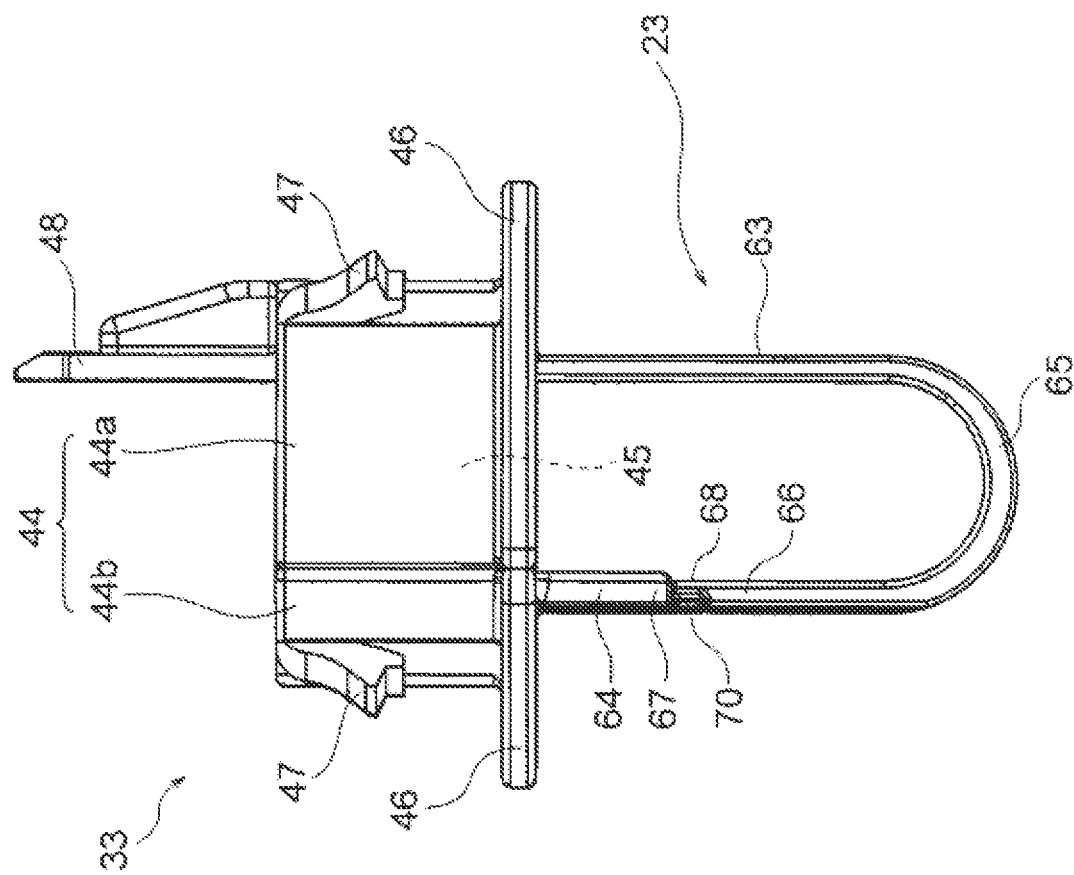
FIG. 9 is a view of an inner member including the deformation preventing walls corresponding to FIG. 2C, and is a view seen from the direction of the arrow B in FIG. 1B (the third embodiment).
Figure 10:
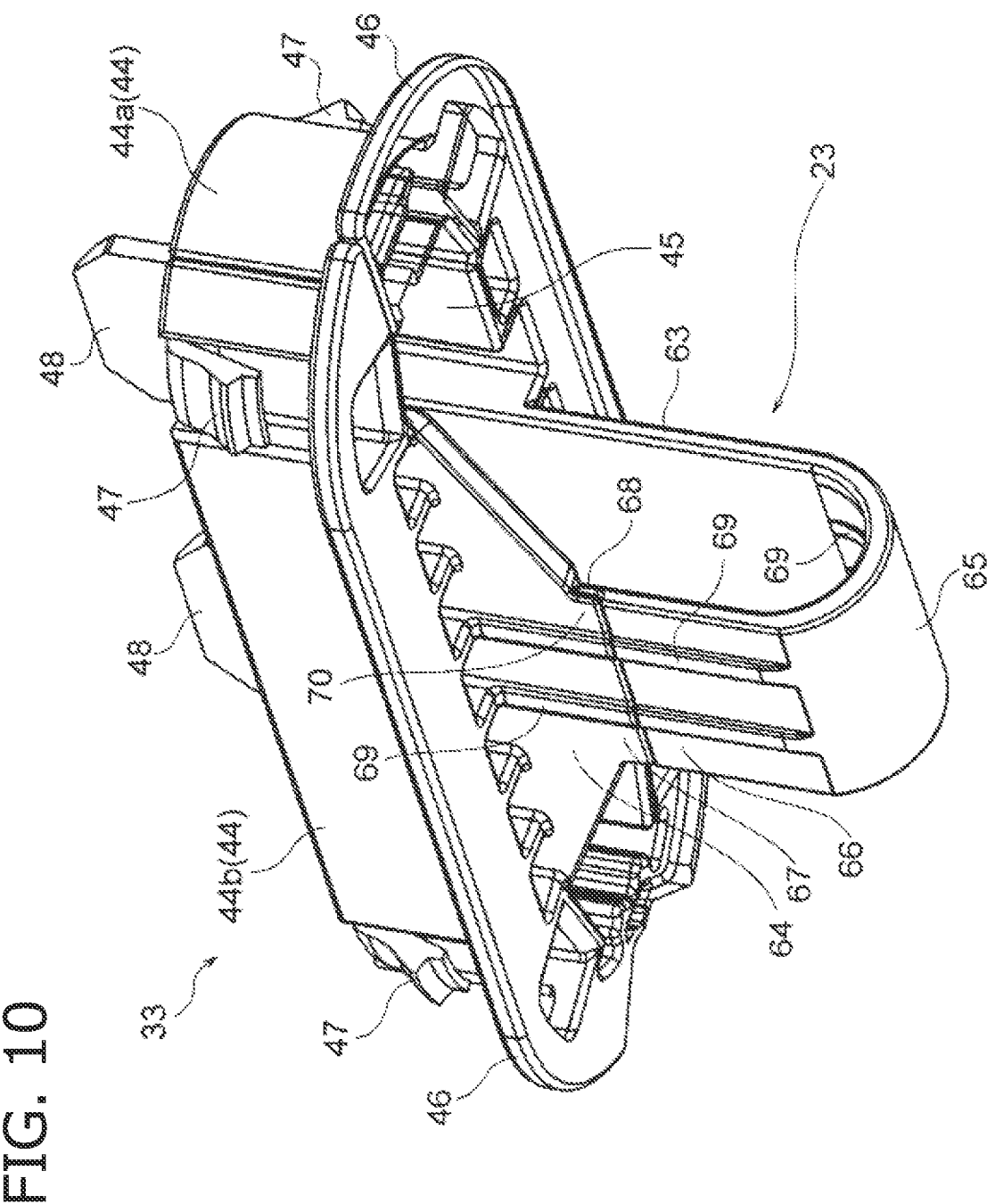
FIG. 10 is a perspective view of the inner member in FIG. 9.
Figure 11:
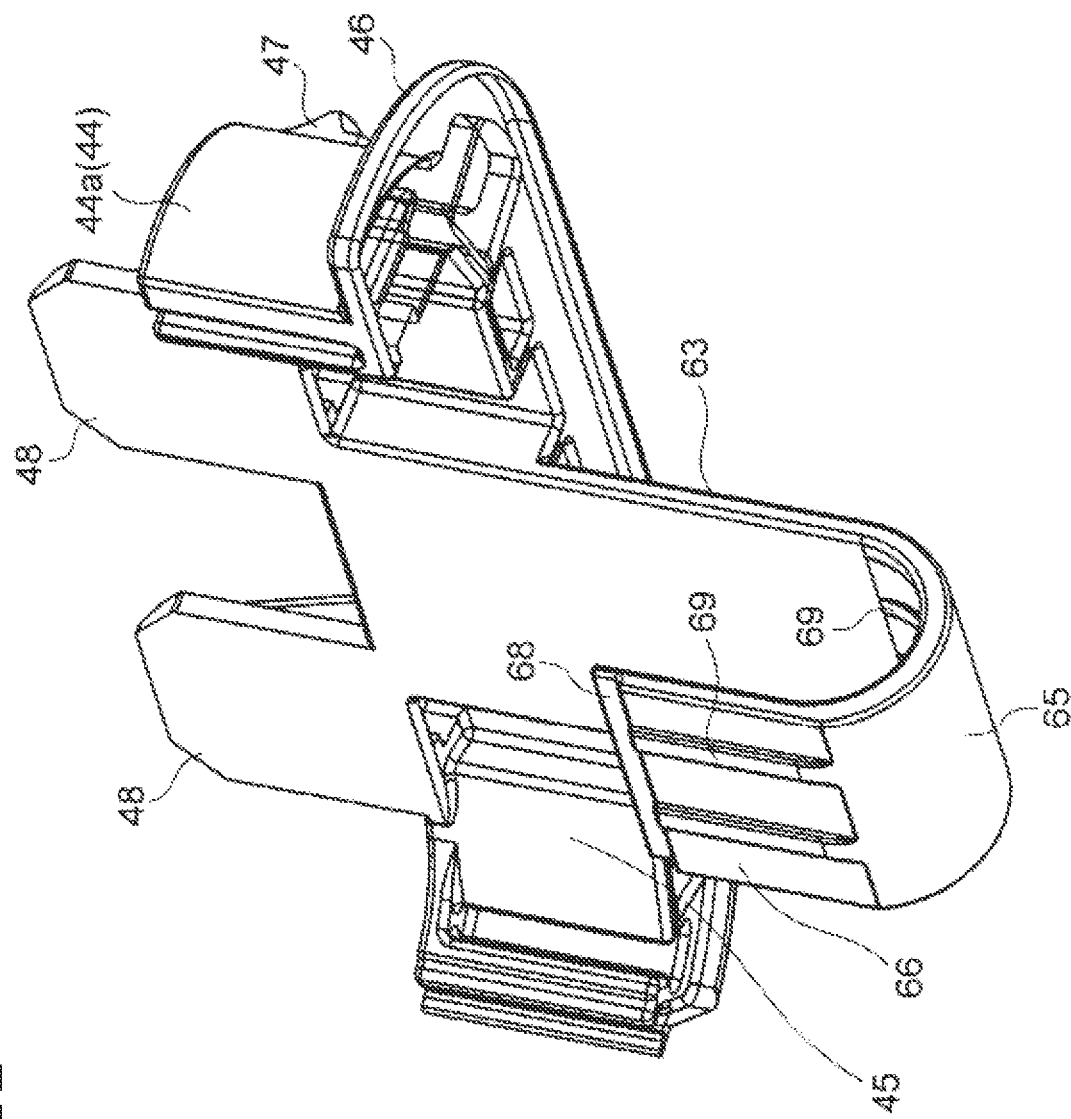
FIG. 11 is a perspective view of a first divided inner in FIG. 10.
Figure 12:
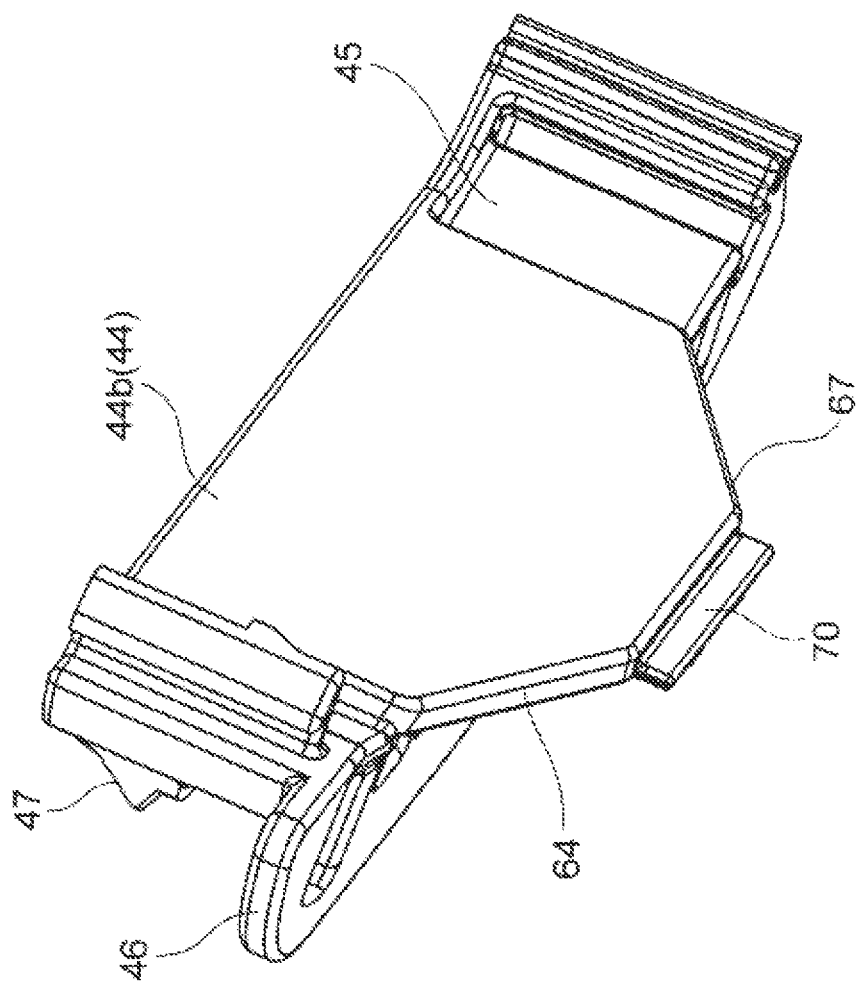
FIG. 12 is a perspective view of a second divided inner in FIG. 10.

Hereinafter, the third embodiment will be described with reference to the drawings. FIG. 9 is a view of an inner member including the deformation preventing walls corresponding to FIG. 2C. FIG. 10 is a perspective view of the inner member in FIG. 9, FIG. 11 is a perspective view of a first divided inner in FIG. 10, and FIG. 12 is a perspective view of a second divided inner in FIG. 10. The same components as those of the first and second embodiments are denoted by the same reference numerals, and detailed description thereof will be omitted.

<Grommet Detachment Preventing Structure 23 According to Third Embodiment>

In FIGS. 2C and 9, the grommet detachment preventing structure 23 according to the third embodiment is formed in the inner member 33 similarly to the first and second embodiments. The grommet detachment preventing structure 23 according to the third embodiment corresponds to the two deformation preventing walls 63, 64 integrated with the inner member main body 44. The two deformation preventing walls 63, 64 serving as the grommet detachment preventing structure 23 are formed to respectively have a J-shaped cross section in which an intermediate portion 65 is bent and a straight I-shaped cross section, and are formed to have a U-shaped cross section when the two are viewed as a whole. The two deformation preventing walls 63, 64 are formed as portions that prevent the side portions 41 of the electric wire accommodating dome portion 40 from being deformed inward. The two deformation preventing walls 63, 64 are formed in a shape in which tip end portions 66, 67 are engaged with each other. Base end sides of the two deformation preventing walls 63, 64 are disposed at positions the same as those of the first and second embodiments.

In FIGS. 9 to 12, the deformation preventing wall 63 is formed as a wall portion having no change in width from the base end side continuous with the first divided inner 44a to the intermediate portion 65 and the tip end portions 66. The deformation preventing wall 63 is formed so as to extend from the base end side to a part of the intermediate portion 65 and the tip end portions 66 along a wall inner surface of the side portion 41 of the electric wire accommodating dome portion 40. The deformation preventing wall 63 is formed such that the drawn-out portion 34 of the plurality of electric wires 25 is disposed inside the deformation preventing wall 63 from the base end side to a part of the intermediate portion and the tip end portions 66 (see FIG. 2C). The intermediate portion 65 of the deformation preventing wall 63 is formed in a bent shape so as to extend along a wall inner surface of the arc-shaped bottom portion 42 of the electric wire accommodating dome portion 40. An engaging portion 68 is formed on the tip end portions 66 of the deformation preventing wall 63 as described above. In the present embodiment, the engaging portion 68 is formed to prevent the deformation preventing wall 64 to be paired with the deformation preventing wall 63 from being displaced inward. The engaging portion 68 is formed as a stepped abutting portion. A reference numeral 69 in the two deformation preventing walls 63, 64 denotes a reinforcing rib.

On the other hand, the deformation preventing wall 64 is formed as a wall portion whose base end side continuous with the second divided inner 44b is wider than that of the deformation preventing wall 63 to be paired. The deformation preventing wall 64 is formed so as to extend from the base end side to the tip end portions 67 along a wall inner surface of the side portion 41 of the electric wire accommodating dome portion 40. The deformation preventing wall 64 is formed so as to extend relatively short. The deformation preventing wall 64 is formed such that the drawn-out portion 34 of the plurality of electric wires 25 is disposed inside. An engaging portion 70 is formed on the tip end portions 57 of the deformation preventing wall 64. The engaging portion 70 is formed as a stepped abutting portion corresponding to a shape of the engaging portion 68 to be engaged.

<Effects of Grommet Detachment Preventing Structure 23 According to Third Embodiment>

As described above with reference to FIGS. 2C and 9 to 12, according to the grommet detachment preventing structure 23 of the third embodiment, the inner member 33 includes the two deformation preventing walls 63, 64, and the two deformation preventing walls 63, 64 are portions having a shape extending along the wall inner surfaces of the electric wire accommodating dome portion 40, even if an external force is applied to the electric wire accommodating dome portion 40 for some reason, the electric wire accommodating dome portion 40 can be prevented from being deformed inward by the two deformation prevention walls 63, 64. This deformation prevention can also prevent detachment of the flange assembly portion 39 of the grommet 26 from the flange 46 of the inner member 33.

In the third embodiment, detachment of the grommet 26 can be prevented as in the first and second embodiments. Since the grommet detachment preventing structure 23 according to the third embodiment is adopted, a better wire harness 21 (see FIGS. 1A and 1B) can be provided.

Fourth Embodiment

Figure 13:
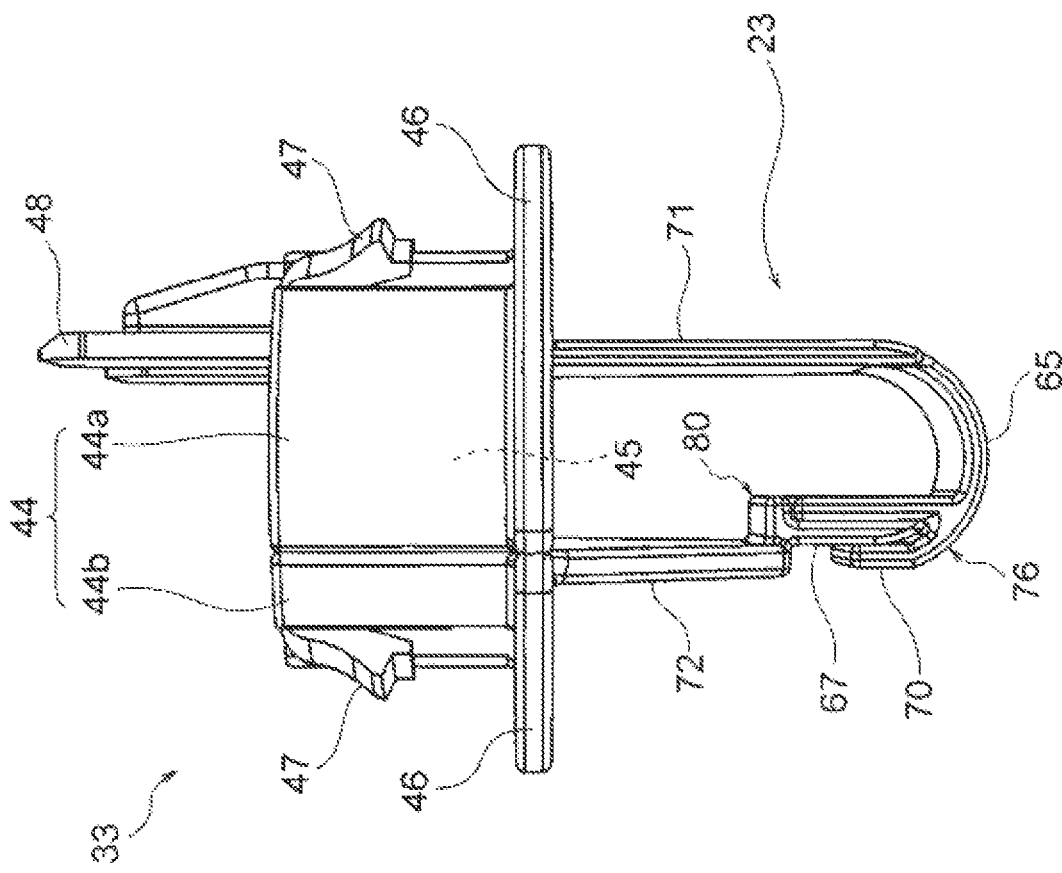
FIG. 13 is a view of an inner member having the deformation preventing walls corresponding to FIG. 2C, and is a view seen from the direction of the arrow B in FIG. 1B (the fourth embodiment).
Figure 14:
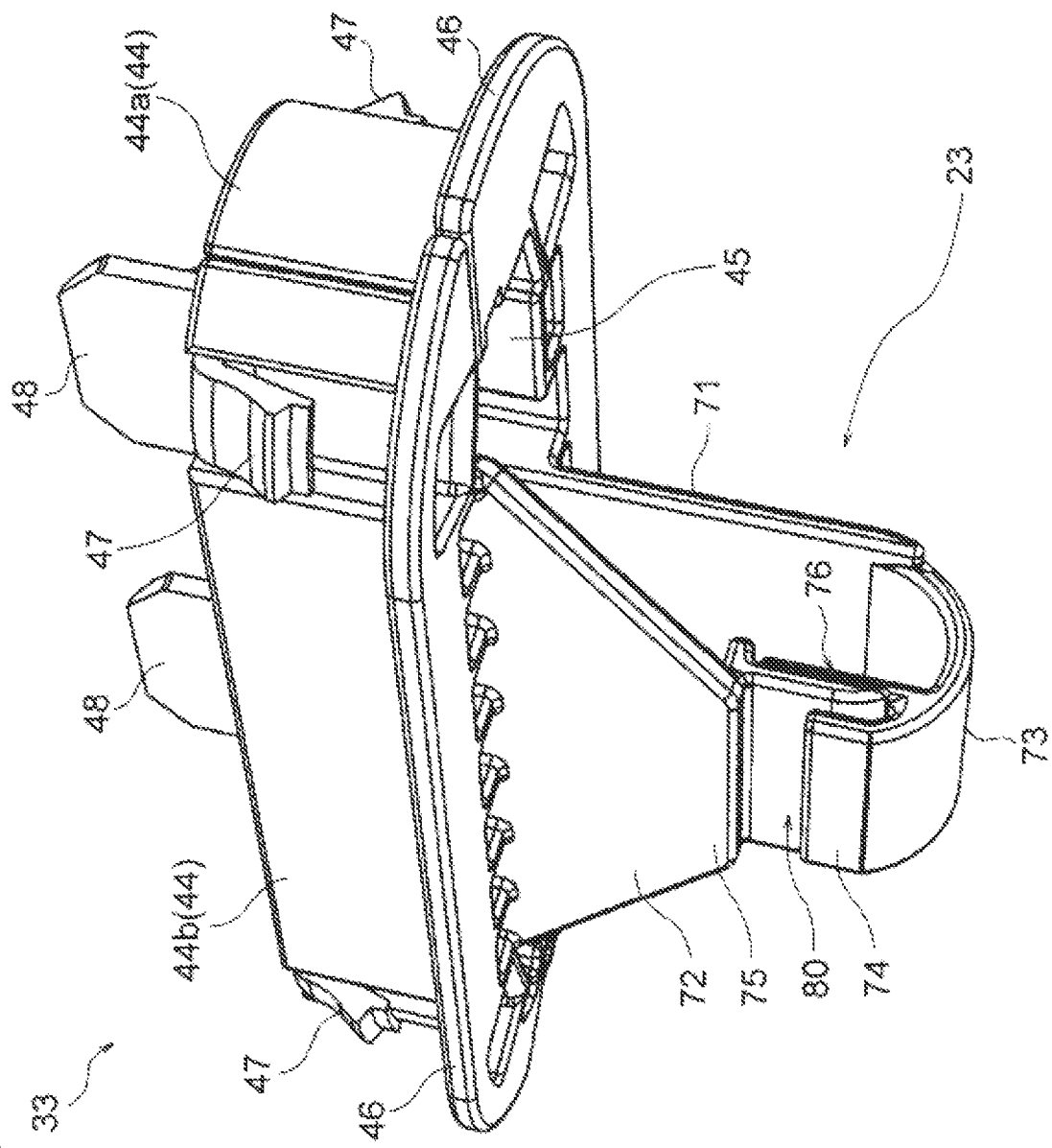
FIG. 14 is a perspective view of the inner member in FIG. 13.
Figure 15:
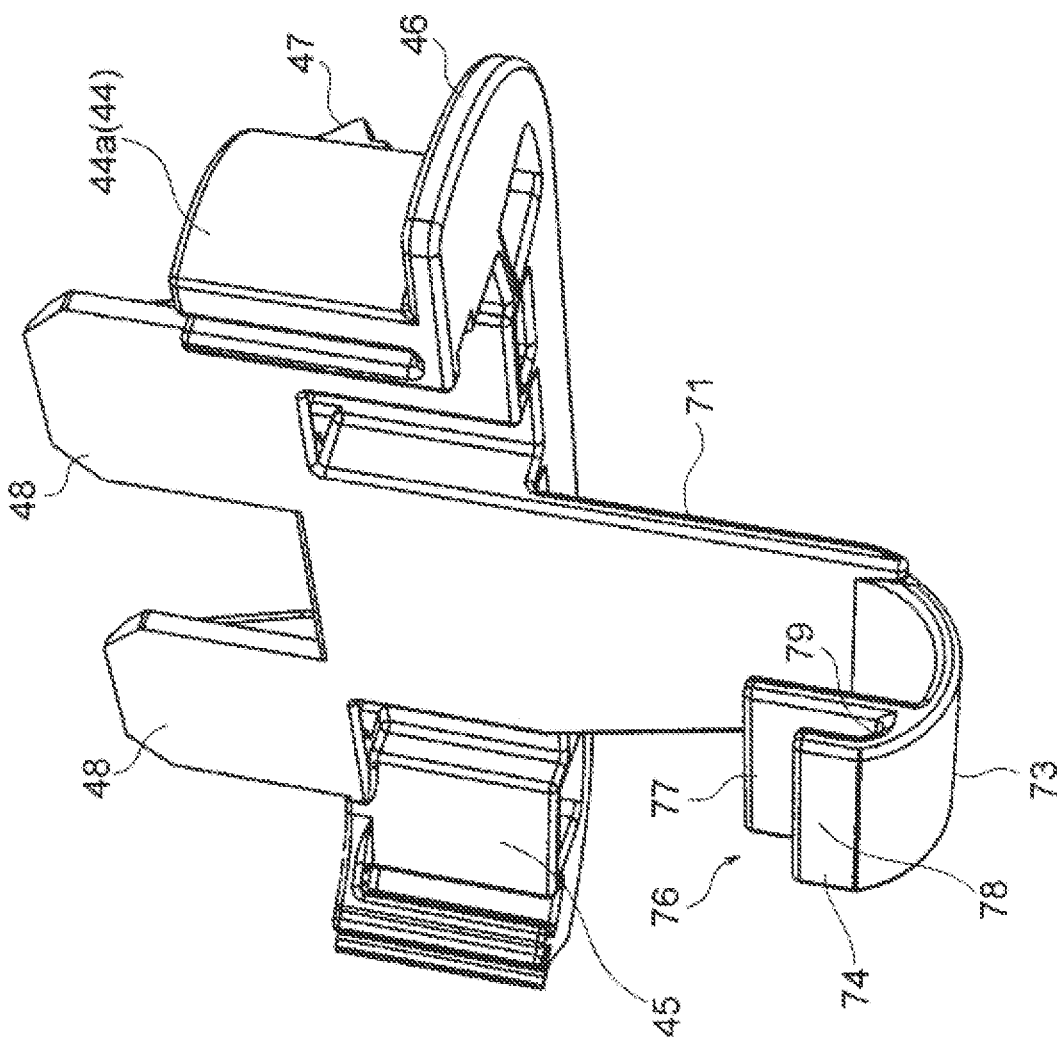
FIG. 15 is a perspective view of a first divided inner in FIG. 14.
Figure 16:
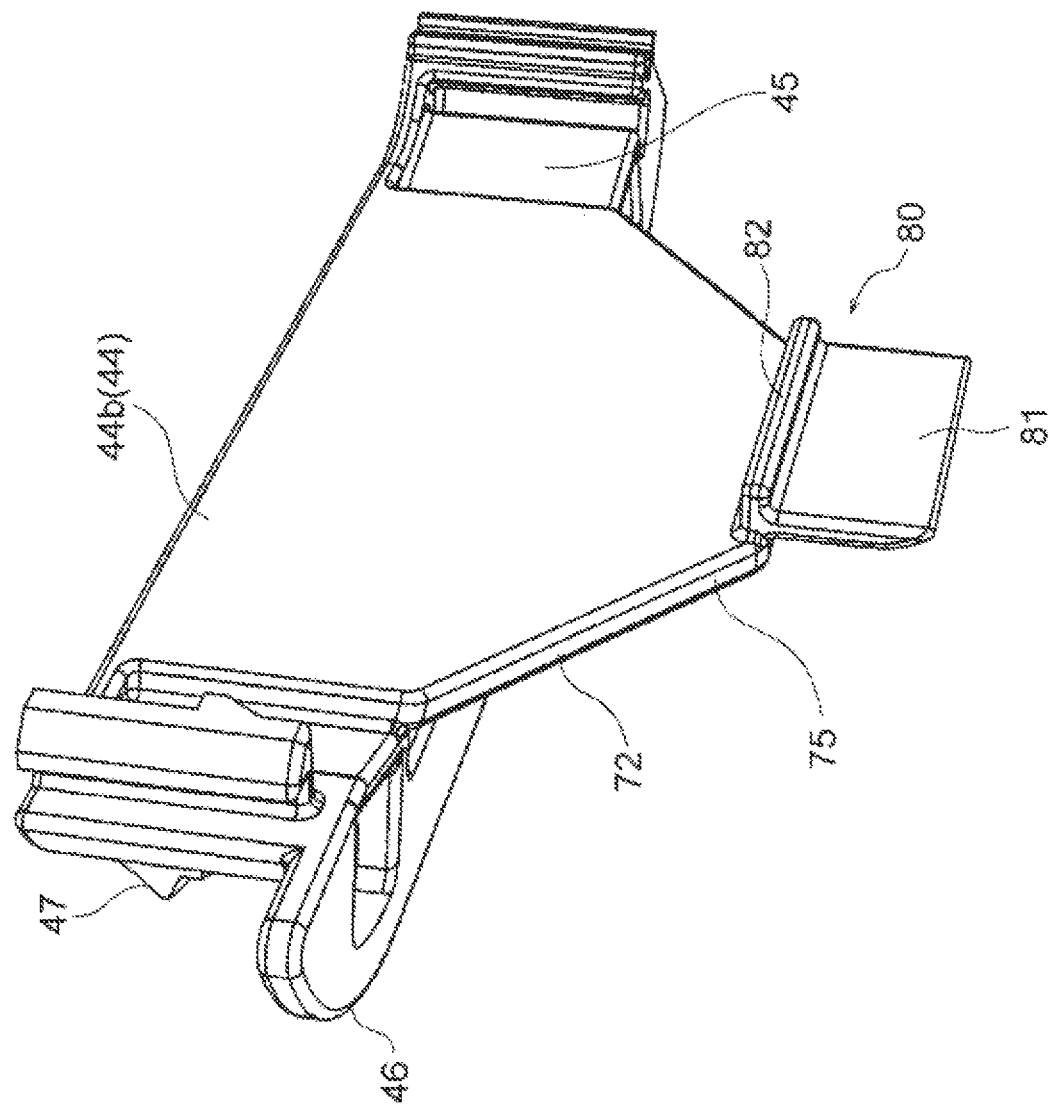
FIG. 16 is a perspective view of a second divided inner in FIG. 14.

Hereinafter, the fourth embodiment will be described with reference to the drawings. FIG. 13 is a view of an inner member including the deformation preventing walls corresponding to FIG. 2C. FIG. 14 is a perspective view of the inner member in FIG. 13, FIG. 15 is a perspective view of a first divided inner in FIG. 14, and FIG. 16 is a perspective view of a second divided inner in FIG. 14. The same components as those of the first to third embodiments are denoted by the same reference numerals, and detailed description thereof will be omitted.

<Grommet Detachment Preventing Structure 23 According to Fourth Embodiment>

In FIGS. 2C and 13, the grommet detachment preventing structure 23 according to the fourth embodiment is formed in the inner member 33 similarly to the first to third embodiments. The grommet detachment preventing structure 23 according to the fourth embodiment corresponds to the two deformation preventing walls 71, 72 integrated with the inner member main body 44. The two deformation preventing walls 71, 72 serving as the grommet detachment preventing structure 23 are formed to respectively have a J-shaped cross section in which an intermediate portion 73 is bent and a straight I-shaped cross section, and are formed to have a U-shaped cross section when the two are viewed as a whole. The two deformation preventing walls 71, 72 are formed as portions that prevent the side portions 41 of the electric wire accommodating dome portion 40 from being deformed inward. The two deformation preventing walls 71, 72 are formed in a shape in which tip end portions 74, 75 are engaged with each other. Base end sides of the two deformation preventing walls 71, 72 are disposed at positions the same as those of the first to third embodiments.

In FIGS. 13 to 16, the deformation preventing wall 71 is formed as a wall portion having a small change in width from the base end side continuous with the first divided inner 44a to the intermediate portion 73 and the tip end portions 74. The deformation preventing wall 71 is formed so as to extend from the base end side to a part of the intermediate portion 73 and the tip end portions 74 along a wall inner surface of the side portion 41 of the electric wire accommodating dome portion 40. The deformation preventing wall 71 is formed such that the drawn-out portion 34 of the plurality of electric wires 25 is disposed inside the deformation preventing wall 71 from the base end side to a part of the intermediate portion 73 and the tip end portions 74 (see FIG. 2C). The intermediate portion 73 of the deformation preventing wall 71 is formed in a bent shape so as to extend along a wall inner surface of the arc-shaped bottom portion 42 of the electric wire accommodating dome portion 40. An engaging portion 76 is formed on the tip end portions 74 of the deformation preventing wall 71 as described above. In the present embodiment, the engaging portion 76 is formed to prevent the deformation preventing wall 72 to be paired from being displaced inward. As will be described later, the engaging portion 76 is formed so as not to be laterally displaced since the engaging portion 76 can be held by insertion. The engaging portion 76 is formed as a groove-shaped portion having a long inner wall 77, a short outer wall 78 and a connecting portion 79 therebetween.

On the other hand, the deformation preventing wall 72 is formed as a wall portion whose base end side continuous with the second divided inner 44b is wider than that of the deformation preventing wall 71 to be paired. The deformation preventing wall 72 is formed so as to extend from the base end side to the tip end portions 75 along a wall inner surface of the side portion 41 of the electric wire accommodating dome portion 40. The deformation preventing wall 72 is formed such that the drawn-out portion 34 of the plurality of electric wires 25 is disposed inside. An engaging portion 80 is formed on the tip end portions 75 of the deformation preventing wall 72. The engaging portion 80 is formed in a shown shape by including an insertion wall portion 81 that matches a groove shape of the engaging portion 76 to be engaged, and an abutting portion 82 that abuts on a tip end of the inner wall 77 of the engaging portion 76.

<Effects of Grommet Detachment Preventing Structure 23 According to Fourth Embodiment>

As described above with reference to FIGS. 2C and 13 to 16, according to the grommet detachment preventing structure 23 of the fourth embodiment, the inner member 33 includes the two deformation preventing walls 71, 72, and the two deformation preventing walls 71, 72 are portions having a shape extending along the wall inner surfaces of the electric wire accommodating dome portion 40, even if an external force is applied to the electric wire accommodating dome portion 40 for some reason, the electric wire accommodating dome portion 40 can be prevented from being deformed inward by the two deformation prevention walls 71, 72. This deformation prevention can also prevent detachment of the flange assembly portion 39 of the grommet 26 from the flange 46 of the inner member 33.

In the fourth embodiment, detachment of the grommet 26 can be prevented as in the first to third embodiments. Since the grommet detachment preventing structure 23 according to the fourth embodiment is adopted, a better wire harness 21 (see FIGS. 1A and 1B) can be provided.

Fifth Embodiment

Figure 17:
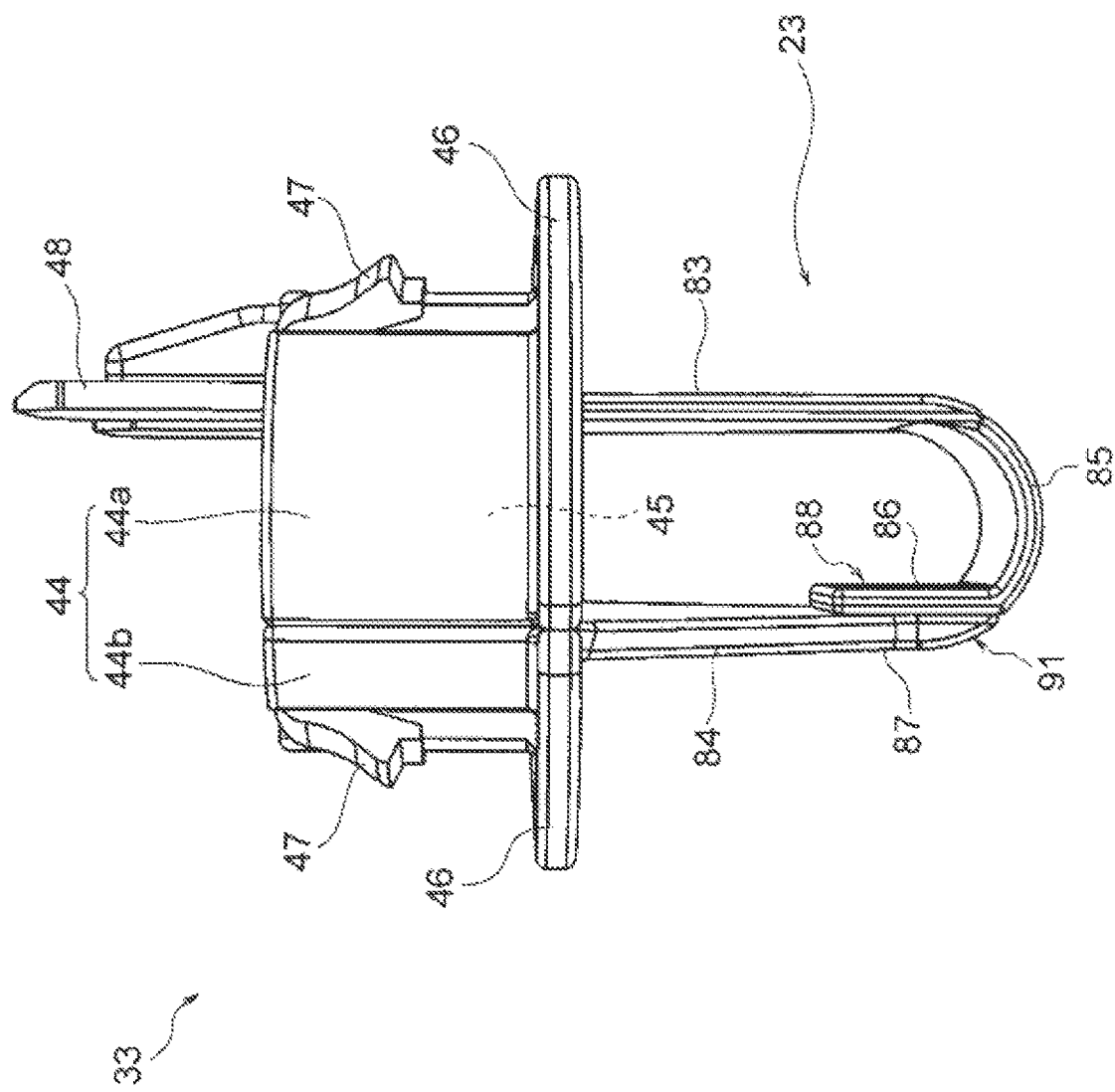
FIG. 17 is a view of an inner member having the deformation preventing walls corresponding to FIG. 2C, and is a view seen from the direction of the arrow B in FIG. 1B (the fifth embodiment).
Figure 18:
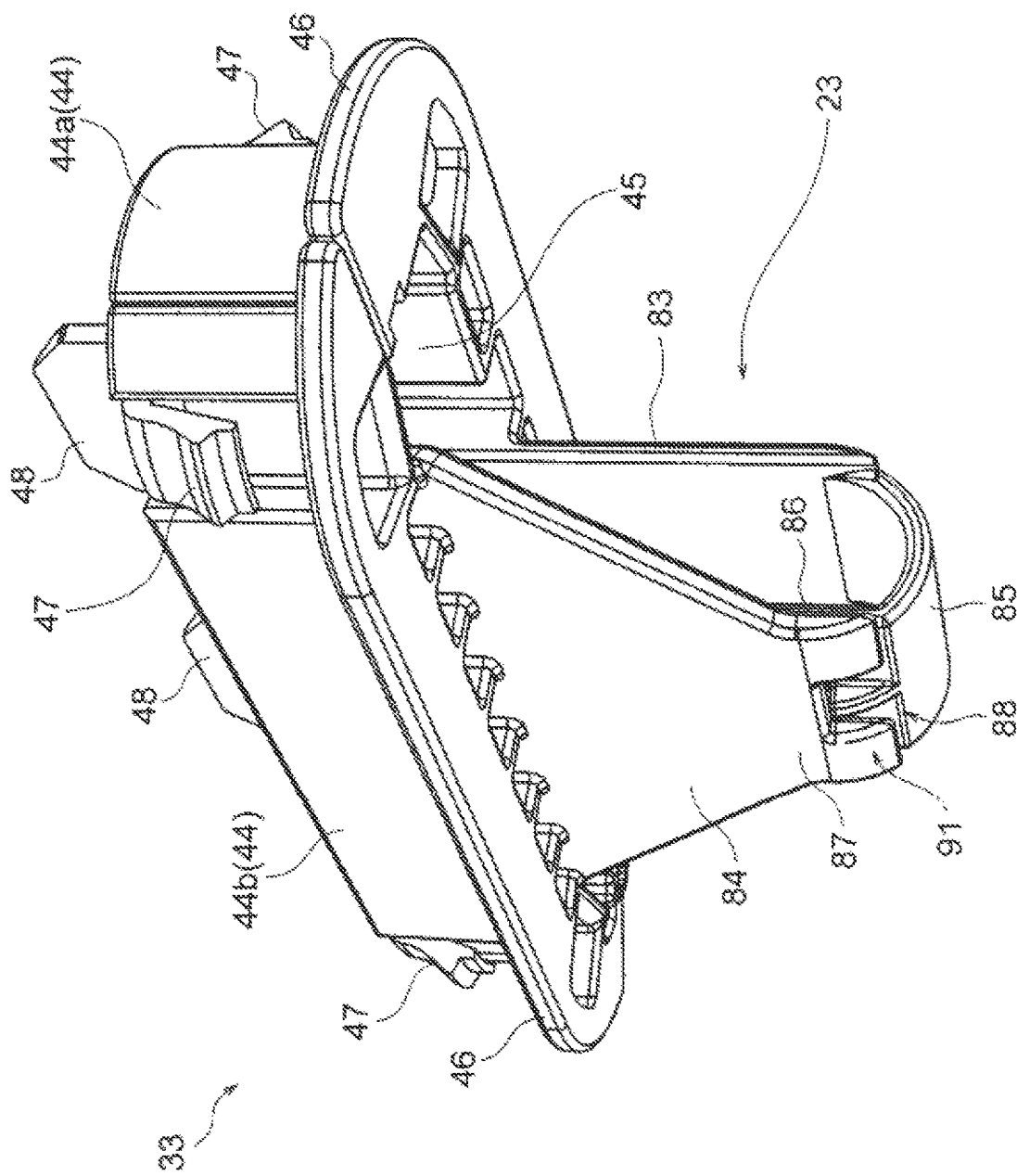
FIG. 18 is a perspective view of the inner member in FIG. 17.
Figure 19:
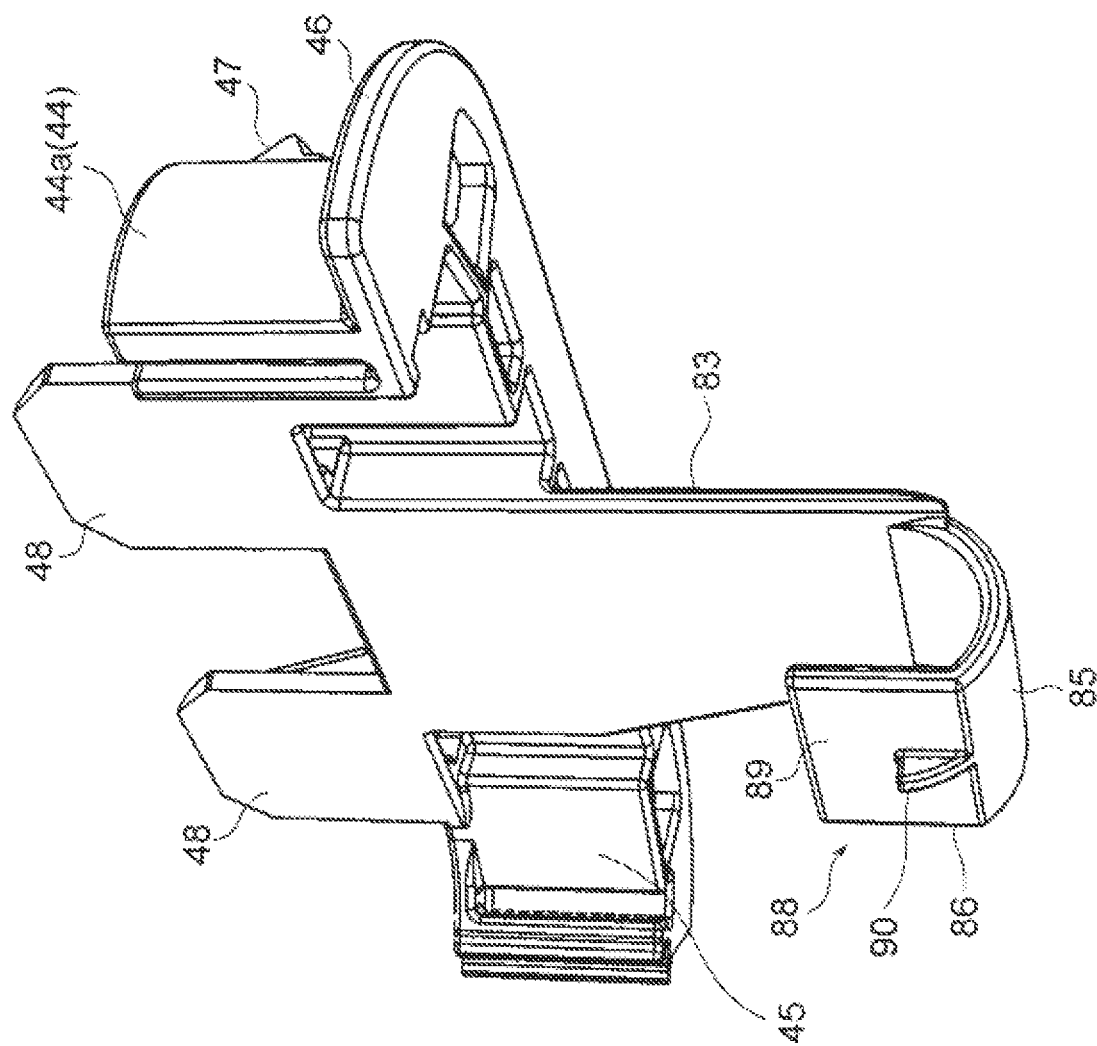
FIG. 19 is a perspective view of a first divided inner in FIG. 18.
Figure 20:
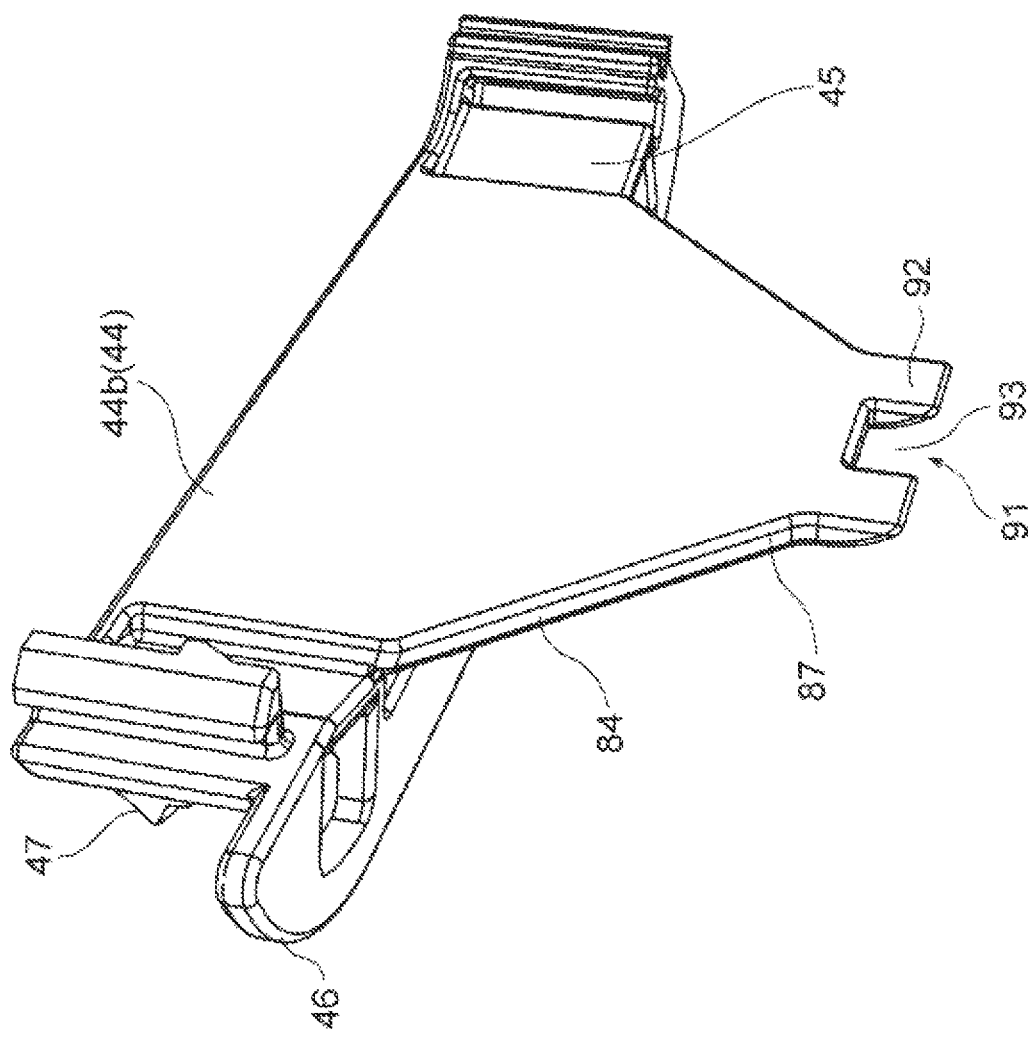
FIG. 20 is a perspective view of a second divided inner in FIG. 18.
Figure 21A:
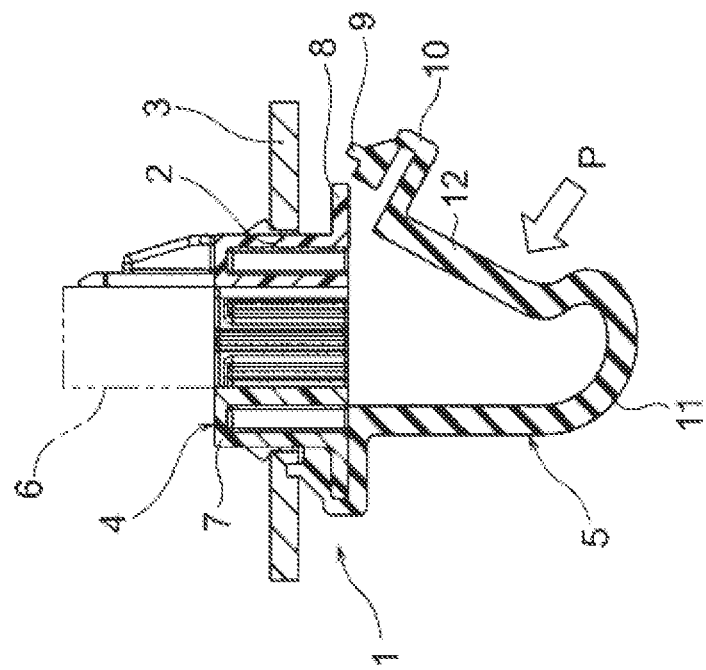
Figure 21B:
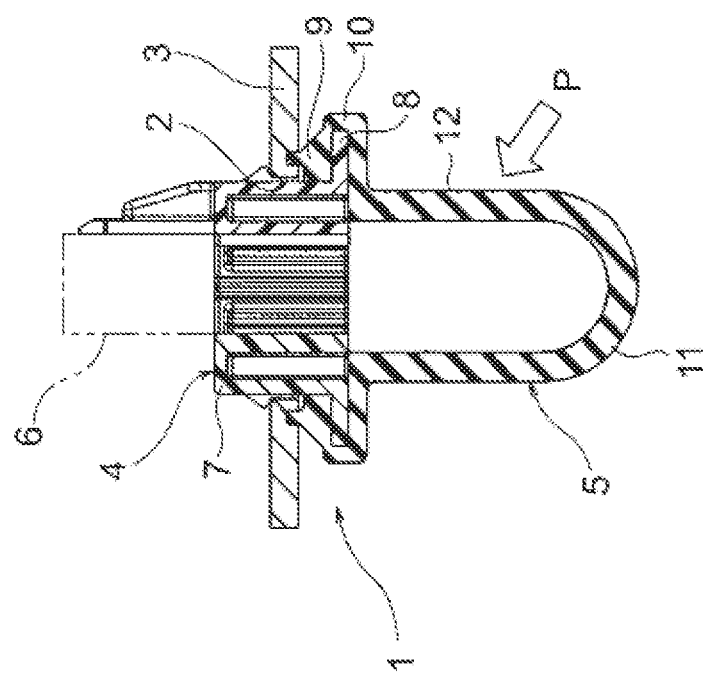

Hereinafter, the fifth embodiment will be described with reference to the drawings. FIG. 17 is a view of an inner member including the deformation preventing walls corresponding to FIG. 2C. FIG. 18 is a perspective view of the inner member in FIG. 17, FIG. 19 is a perspective view of a first divided inner in FIG. 18, and FIG. 20 is a perspective view of a second divided inner in FIG. 18. The same components as those of the first to fourth embodiments are denoted by the same reference numerals, and detailed description thereof will be omitted.

<Grommet Detachment Preventing Structure 23 According to Fifth Embodiment>

In FIGS. 2C and 17, the grommet detachment preventing structure 23 according to the fifth embodiment is formed in the inner member 33 similarly to the first to fourth embodiments. The grommet detachment preventing structure 23 according to the fifth embodiment corresponds to the two deformation preventing walls 83, 84 integrated with the inner member main body 44. The two deformation preventing walls 83, 84 serving as the grommet detachment preventing structure 23 are formed to respectively have a J-shaped cross section in which an intermediate portion 85 is bent and a straight I-shaped cross section, and are formed to have a U-shaped cross section when the two are viewed as a whole. The two deformation preventing walls 83, 84 are formed as portions that prevent the side portions 41 of the electric wire accommodating dome portion 40 from being deformed inward. The two deformation preventing walls 83, 84 are formed in a shape in which tip end portions 86, 87 are engaged with each other. Base end sides of the two deformation preventing walls 83, 84 are disposed at positions the same as those of the first to fourth embodiments.

In FIGS. 17 to 20, the deformation preventing wall 83 is formed as a wall portion having a small change in width from the base end side continuous with the first divided inner 44a to the intermediate 85 and the tip end portions 86. The deformation preventing wall 83 is formed so as to extend from the base end side to a part of the intermediate portion 85 and the tip end portions $6 along a wall inner surface of the side portion 41 of the electric wire accommodating dome portion 40. The deformation preventing wall 83 is formed such that the drawn-out portion 34 of the plurality of electric wires 25 is disposed inside the deformation preventing wall 83 from the base end side to a part of the intermediate portion 85 and the tip end portions 86 (see FIG. 2C). The intermediate portion 85 of the deformation preventing wall 83 is formed in a bent shape so as to extend along a wall inner surface of the arc-shaped bottom portion 42 of the electric wire accommodating dome portion 40. An engaging portion 88 is formed on the tip end portions 85 of the deformation preventing wall 83 as described above. In the present embodiment, the engaging portion 88 is formed to prevent the deformation preventing wall 84 to be paired from being displaced inward. As will be described later, the engaging portion 88 is formed so as not to be laterally displaced because of uneven engagement. The engaging portion 88 is formed in a shown shape by including an abutting wall 89 and a convex portion 90 protruding from a center of a lower portion of the abutting wall 89.

On the other hand, the deformation preventing wall 84 is formed as a wall portion whose base end side continuous with the second divided inner 44b is wider than that of the deformation preventing wall 83 to be paired. The deformation preventing wall 84 is formed so as to extend from the base end side to the tip end portions 87 along a wall inner surface of the side portion 41 of the electric wire accommodating dome portion 40. The deformation preventing wall 84 is formed such that the drawn-out portion 34 of the plurality of electric wires 25 is disposed inside. An engaging portion 91 is formed on the tip end portions 87 of the deformation preventing wall 84. The engaging portion 91 is formed in a shown shape by including an abutting wall 92 that abuts on an abutting wall 88 of the engaging portion 89 to be engaged, and a recess 93 that is formed by cutting out a center of a lower portion of the abutting wall 92.

<Effects of Grommet Detachment Preventing Structure 23 According to Fifth Embodiment>

As described above with reference to FIGS. 2C and 17 to 20, according to the grommet detachment preventing structure 23 of the fifth embodiment, the inner member 33 includes the two deformation preventing walls 83, 84, and the two deformation preventing walls 71, 72 are portions having a shape extending along the wall inner surfaces of the electric wire accommodating dome portion 40, even if an external force is applied to the electric wire accommodating dome portion 40 for some reason, the electric wire accommodating dome portion 40 can be prevented from being deformed inward by the two deformation prevention walls 83, 84. This deformation prevention can also prevent detachment of the flange assembly portion 39 of the grommet 26 from the flange 46 of the inner member 33.

In the fifth embodiment, detachment of the grommet 26 can be prevented as in the first to fourth embodiments. Since the grommet detachment preventing structure 23 according to the fifth embodiment is adopted, a better wire harness 21 (see FIGS. 1A and 1B) can be provided.

Here, the details of the above embodiments are summarized as follows. Aspect of non-limiting embodiments of the present disclosure relates to a wire harness, which includes: a connector that is disposed so as to be aligned with an attachment hole of a panel; a grommet that is assembled to the connector and is in close contact with one opening edge portion of the attachment hole; and a plurality of electric wires that are inserted into the grommet. The connector includes terminal fittings provided at end portions of the plurality of electric wires, a connector housing in which the terminal fittings are accommodated, and an inner member having an annular plate-shaped flange disposed outside the connector housing. The grommet includes a panel close contact portion that is in close contact with the one opening edge portion, a flange assembly portion that is assembled to the flange, and an electric wire accommodating dome portion that accommodates a drawn-out portion of the plurality of electric wires immediately after being drawn out from the connector housing (the drawn-out portion of the plurality of electric wires are positioned so as to be close to or near to the connector housing). The inner member includes two deformation preventing walls that prevent the electric wire accommodating dome portion from being deformed inward. The two deformation preventing walls extend along a wall inner surface of the electric wire accommodating dome portion and are disposed so as to sandwich the drawn-out portion therebetween.

According to the present disclosure above, since the inner member includes the two deformation preventing walls, and the two deformation preventing walls are portions having the shape extending along the wall inner surface of the electric wire accommodating dome portion, even if an external force is applied to the electric wire accommodating dome portion for some reason, the electric wire accommodating dome portion can be prevented from being deformed inward by the two deformation preventing walls. This deformation prevention can also prevent detachment of the flange assembly portion of the grommet from the flange of the inner member. According to the present disclosure, the wire harness including a grommet detachment preventing structure that prevents detachment of the grommet can be provided.

According to an aspect of the present disclosure, there is provided that each of the two deformation preventing walls has a straight I-shaped cross section.

According to the present disclosure above, since the two walls each having the straight I-shaped cross section extend along the wall inner surface of the electric wire accommodating dome portion as the deformation preventing walls, even if an external force is applied to the electric wire accommodating dome portion for some reason, the electric wire accommodating dome portion can be prevented from being deformed inward. According to the present disclosure, one aspect of the two deformation preventing walls that prevent detachment of the grommet can be provided.

According to an aspect of the present disclosure, there is provided that each of the two deformation preventing walls has a J-shaped cross section whose tip end portion is bent, and an entire of the J-shaped cross sections of the two deformation preventing walls has a U-shaped cross section.

According to the present disclosure above, since the two walls each having the J-shaped cross section in which the tip end portions is bent extend along the wall inner surface of the electric wire accommodating dome portion as the deformation preventing walls, even if an external force is applied to the electric wire accommodating dome portion for some reason, the electric wire accommodating dome portion can be prevented from being deformed inward. According to the present disclosure, one aspect of the two deformation preventing walls that prevent detachment of the grommet can be provided.

According to an aspect of the present disclosure, there is provided that the two deformation preventing walls are formed in a shape in which the tip end portions are engaged with each other.

According to the present disclosure above, since the tip end portions of the two deformation preventing walls are engaged with each other, shape stability of the two deformation preventing walls can be ensured, thereby preventing detachment of the grommet.

According to an aspect of the present disclosure, there is provided that the two deformation preventing walls are formed to respectively have a straight I-shaped cross section and a J-shaped cross section whose intermediate portion is bent, and an entire of the straight I-shaped cross section and the J-shaped cross section of the two deformation preventing walls has a U-shaped cross section.

According to the present disclosure above, since the two walls including a wall having the straight I-shaped cross section and a wall having the J-shaped cross section in which the intermediate portion is bent extend along the wall inner surface of the electric wire accommodating dome portion as the deformation preventing walls, even if an external force is applied to the electric wire accommodating dome portion for some reason, the electric wire accommodating dome portion can be prevented from being deformed inward. According to the present disclosure, one aspect of the two deformation preventing walls that prevent detachment of the grommet can be provided.

According to an aspect of the present disclosure, there is provided that the two deformation preventing walls are formed in a shape in which a tip end portion in the straight I-shaped cross section and a tip end portion in the J-shaped cross section whose intermediate portion is bent are engaged with each other.

According to the present disclosure above, since the tip end portions (end portions) of the two deformation preventing walls respectively having an I-shape and a J-shape are engaged with each other, shape stability of the two deformation preventing walls can be ensured, thereby preventing detachment of the grommet.

According to an aspect of the present disclosure, there is provided that the attachment hole of the panel is formed in an oval shape having a pair of straight portions and a pair of arc portions, and the two deformation preventing walls are disposed on sides of the pair of straight portions.

According to the present disclosure above, since the two deformation preventing walls are disposed on the sides of the pair of straight portions of the attachment hole of the panel, the deformation can be prevented even at a position where the electric wire accommodating dome portion of the related-art grommet is surely deformed inward.

According to an aspect of the present disclosure, there is provided a grommet detachment preventing structure includes: a panel having an attachment hole; a connector that is disposed to be aligned with the attachment hole; and a grommet that is assembled to the connector and is in close contact with one opening edge portion of the attachment hole. The connector includes terminal fittings provided at terminals of a plurality of electric wires, a connector housing in which the terminal fittings are accommodated, and an inner member having an annular plate-shaped flange disposed outside the connector housing. The grommet includes a panel close contact portion that is in close contact with the one opening edge portion, a flange assembly portion that is assembled to the flange, and an electric wire accommodating dome portion that accommodates a drawn-out portion of the plurality of electric wires immediately after being drawn out from the connector housing (the drawn-out portion of the plurality of electric wires are positioned so as to be close to or near to the connector housing). The inner member includes two deformation preventing walls as portions that prevent the electric wire accommodating dome portion from being deformed inward. The two deformation preventing walls are formed in a shape extending along a wall inner surface of the electric wire accommodating dome portion and a shape in which the drawn-out portion is disposed therebetween.

According to the present disclosure above, since the inner member includes the two deformation preventing walls, and the two deformation preventing walls are portions having the shape extending along the wall inner surface of the electric wire accommodating dome portion, even if an external force is applied to the electric wire accommodating dome portion for some reason, the electric wire accommodating dome portion can be prevented from being deformed inward by the two deformation preventing walls. This deformation prevention can also prevent detachment of the flange assembly portion of the grommet from the flange of the inner member. According to the present disclosure, since detachment of the grommet is prevented, a better structure can be provided.

In addition, it goes without saying that various modifications can be made out without departing from the gist of the present disclosure.

What is claimed is:

1. A wire harness comprising:
   a connector disposed so as to be aligned with an attachment hole of a panel;
   a grommet assembled to the connector and being in close contact with one opening edge portion of the attachment hole; and
   a plurality of electric wires that are inserted into the grommet,
   wherein the connector includes:
   terminal fittings provided at end portions of the plurality of electric wires;
   a connector housing that accommodates the terminal fittings; and
   an inner member having an annular plate-shaped flange disposed outside the connector housing;
   wherein the grommet includes:
   a panel close contact portion that is in close contact with the one opening edge portion;
   a flange assembly portion that is assembled to the flange; and
   an electric wire accommodating dome portion that accommodates drawn-out portions of the plurality of electric wires being drawn out from the connector housing;
   wherein the inner member includes two deformation preventing walls configured to prevent the electric wire accommodating dome portion from being deformed inward by abutting on the electric wire accommodating dome; and
   wherein the two deformation preventing walls extend along a wall inner surface of the electric wire accommodating dome portion and are disposed so as to sandwich the drawn-out portion therebetween.

2. The wire harness according to claim 1,
   wherein each of the two deformation preventing walls has a straight I-shaped cross section.

3. The wire harness according to claim 1,
   wherein each of the two deformation preventing walls has a J-shaped cross section whose tip end portion is bent, and an entire of the J-shaped cross sections of the two deformation preventing walls has a U-shaped cross section.

4. The wire harness according to claim 3,
   wherein the two deformation preventing walls are formed in a shape in which the tip end portions are engaged with each other.

5. The wire harness according to claim 1,
   wherein the two deformation preventing walls are formed to respectively have a straight I-shaped cross section and a J-shaped cross section whose intermediate portion is bent, and an entire of the straight I-shaped cross section and the J-shaped cross section of the two deformation preventing walls has a U-shaped cross section.

6. The wire harness according to claim 5,
   wherein the two deformation preventing walls are formed in a shape in which a tip end portion in the straight I-shaped cross section and a tip end portion in the J-shaped cross section whose intermediate portion is bent are engaged with each other.

7. The wire harness according to claim 1,
   wherein the attachment hole of the panel is formed in an oval shape having a pair of straight portions and a pair of arc portions, and the two deformation preventing walls are disposed on sides of the pair of straight portions.

8. A grommet detachment preventing structure comprising:
- a panel having an attachment hole;
- a connector disposed so as to be aligned with the attachment hole; and
- a grommet assembled to the connector and being in close contact with one opening edge portion of the attachment hole,
- wherein the connector includes:
  - terminal fittings provided at end portions of a plurality of electric wires;
  - a connector housing accommodates the terminal fittings; and
- an inner member having an annular plate-shaped flange disposed outside the connector housing;
- wherein the grommet includes:
  - a panel close contact portion that is in close contact with the one opening edge portion;
  - a flange assembly portion that is assembled to the flange; and
  - an electric wire accommodating dome portion that accommodates drawn-out portions of the plurality of electric wires being drawn out from the connector housing;
- wherein the inner member includes two deformation preventing walls configured to prevent the electric wire accommodating dome portion from being deformed inward by abutting on the electric wire accommodating dome; and
- wherein the two deformation preventing walls extend along a wall inner surface of the electric wire accommodating dome portion and are disposed so as to sandwich the drawn-out portion therebetween.

\* \* \* \* \*